United States Patent [19]

Wagner et al.

[11] 4,251,255
[45] Feb. 17, 1981

[54] AGROCHEMICAL AGENTS AND THEIR USE

[75] Inventors: Kuno Wagner; Johanness Niggemann, both of Leverkusen; Kurt Findeisen, Odenthal; Hans Scheinpflug, Leverkusen, all of Fed. Rep. of Germany

[73] Assignee: Bayer Aktiengesellschaft, Leverkusen, Fed. Rep. of Germany

[21] Appl. No.: 11,541

[22] Filed: Feb. 12, 1979

[30] Foreign Application Priority Data

Feb. 14, 1978 [DE] Fed. Rep. of Germany ....... 2806097

[51] Int. Cl.$^3$ ............................................. C05C 11/00
[52] U.S. Cl. ..................................... 71/27; 71/64 SC; 71/DIG. 1; 71/DIG. 2; 71/94; 525/540
[58] Field of Search .......... 71/27, 94, 64 SC, DIG. 1, 71/DIG. 2; 528/362, 422; 525/540; 8/76, 52

[56] References Cited

U.S. PATENT DOCUMENTS

| | | | |
|---|---|---|---|
| 1,464,802 | 8/1923 | Bohart | 8/76 |
| 1,464,803 | 8/1923 | Bohart | 8/52 |
| 2,855,365 | 10/1958 | Burleson | 252/8.5 R |
| 3,160,594 | 12/1964 | Herzog | 71/27 X |
| 3,954,436 | 5/1976 | Vad et al. | 71/27 |

FOREIGN PATENT DOCUMENTS 949060   8/1956   Fed. Rep. of Germany .

OTHER PUBLICATIONS

Volker, *Angew Chem.* 72, No. 11, 1960, pp. 379–384.
Hackh's Chemical Dictionary, McGraw–Hill, N. Y., 1944, pp. 92, 246.
*Encyclopedia of Polymer Science & Technology*, vol. 7, John Wiley & Sons, N. Y., 1967, pp. 568–573.

*Primary Examiner*—S. Leon Bashore
*Assistant Examiner*—Ferris H. Lander
*Attorney, Agent, or Firm*—Gene Harsh; Joseph C. Gil

[57] ABSTRACT

Azulmic acids, stabilized by condensation with carbonyl compounds, said modified azulmic acids containing from 0.5 to 55 percent by weight of ionic groups of the formula

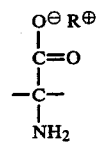

in which R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reaction of the formula

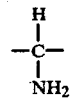

and acid addition salts and complex compounds of these stabilized azulmic acids, and also mixed products of these stabilized azulmic acids with additives can be used as agrochemicals. The products are particularly useful as fertilizers and as soil improving agents.

29 Claims, No Drawings

AGROCHEMICAL AGENTS AND THEIR USE

The present invention relates to the use, as agrochemical agents, of certain azulmic acids stabilised by condensation with carbonyl compounds.

Polymeric hydrocyanic acids, so-called azulmic acids, and several processes for their preparation have already been described (see Houben-Weyl, volume 8 (1952), page 261; German Pat. No. 662,338 and German Pat. No. 949,060). Thus, polymeric hydrocyanic acid is obtained, for example, by heating monomeric hydrocyanic acid to the reaction temperature in dilute aqueous solution in the presence of a basic catalyst, such as ammonia, sodium cyanide, sodium cyanate, potassium cyanate or an alkaline earth, and, after the reaction has started, taking care that a reaction temperature of 120° C. is not exceeded by cooling the mixture (see German Pat. No. 662,338). In a particular variant of this process, further hydrocyanic acid is added to the mixture of solvent, hydrocyanic acid and catalyst in which the reaction has already started (see German Pat. No. 949,060). These known hydrocyanic acid polymers are brown-black to black, pulverulent products which are insoluble in all inert solvents, but which dissolve in 1 N aqueous sodium hydroxide solution, with decomposition, even in the cold. A serious disadvantage of hydrocyanic acid polymers of this type is that when stored, whether under dry conditions or under moist conditions, small amounts of hydrogen cyanide are continuously split off even at room temperature. As the temperature increases, the rate at which hydrogen cyanide is split off also increases. Amounts of hydrocyanic acid which are far above the legally imposed maximum workplace concentration value of hydrocyanic acid of 11 ppm therefore occur in containers holding azulmic acids no matter how mild the storage conditions are. Use in practice of the known hydrocyanic acid polymers for the most diverse purposes thus presents an exceptional danger to the environment and is therefore scarcely possible.

It is also known that hydrocyanic acid polymers can be used as nitrogen fertilisers (see H. Banthien "Synthetische Stickstoffdüngemittel" ("Synthetic Nitrogen Fertilisers") in "Handbuch der Pflanzenernährung und Düngung" ("Handbook of Plant Nutrition and Fertilisation") II/2, 1968, Springer-Verlag, Vienna/New York; German Pat. No. 911,018; and Angew. Chem. 72, (1960) pages 379–384). A disadvantage is, however, that hydrocyanic acid is split off from these products, especially under hydrolytic conditions. Their use in practice as fertilisers is therefore scarcely possible.

According to a proposal by Th. Völker, the brown-black polymeric hydrocyanic acid (azulmic acid) prepared in water has essentially the following formula (see Angew. Chem. 72, (1960) pages 379–384):

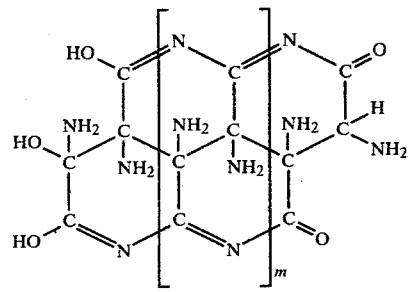

A degree of polymerisation (HCN) of $X = 15-24$ has been calculated from the oxygen contents of known azulmic acids, so that values of 1 to 4 result from m in formula (I). The maximum molecular weights achieved for the polymers are slightly above 700.

It has now been found that azulmic acids, stabilised by condensation with carbonyl compounds, containing from 0.5 to 55 percent by weight of ionic groups of the general formula

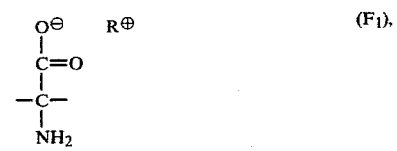

in which R represents hydrogen, ammonium, one equivalent of a protonated or quaternised organic nitrogen base or of a sulphonium cation or one equivalent of a metal cation,
and containing from 0.5 to 15 percent by weight of groups formed by decarboxylation reactions, of the formula

and acid addition salts and complex compounds of these stabilised azulmic acids, and also mixed products of these stabilised azulmic acids with additives, can be used as agrochemical agents.

In particular, the present invention provides a fertiliser or soil-improving composition comprising as active ingredient such a stabilized azulmic acid, an acid-addition salt thereof, a complex compound thereof or a mixed product thereof, in admixture with a solid or liquefied gaseous diluent or carrier or in admixture with a liquid diluent or carrier containing a surface-active agent.

The present invention also provides a method of fertilising or improving soil which comprises applying to soil such a stabilized azulmic acid, an acid-addition salt thereof, a complex compound thereof or a mixed product thereof, alone or in admixture with a diluent or carrier.

It is to be described as exceptionally surprising that, in contrast to the azulmic acids hitherto known, the azulmic acids which have been subjected to a condensation reaction with carbonyl compounds, and acid addition salts and complex compounds thereof and mixed products thereof with additives are extremely resistant towards the splitting-off of hydrogen cyanide. Thus, at temperatures of up to 130° C., in some cases at temperatures of up to 180° C. and in extreme cases even at temperatures of up to 200° C., virtually no hydrogen cyanide is split off from the products to be used according to the invention. The amounts of hydrogen cyanide split off which can be detected analytically are zero or, even under most unfavourable conditions, are below the legally imposed, maximum workplace concentration values. Furthermore, the products to be used according to the invention are also very stable towards the hydrolytic splitting-off of hydrogen cyanide. Thus, even after treating azulmic acids, stabilised as described above, in an aqueous medium at 100° C. for three hours, no cyanide ions, or less than $0.2 \times 10^{-6}$ g of cyanide ions per gram of water, can be detected.

It is also surprising that the azulmic acids stabilised by condensation with carbonyl compounds, and acid addition salts and complex compounds thereof and mixed products thereof with additives can be used as agrochemical agents. On the basis of the known state of the art, it had to be assumed that, analogously to the case of the hydrocyanic polymers already known, hydrogen cyanide would be split off from the products according to the invention on storage and, above all, under hydrolytic conditions. However, in contrast to expectations, this is not the case.

The azulmic acids stabilised by condensation with carbonyl compounds, and acid addition salts and complex compounds thereof and mixed products thereof with additives have a number of advantages. Thus, they have a substantially higher swellability than the previously known azulmic acids which are almost free from structural defects, and therefore, in contrast to the previously known azulmic acids, have the most diverse uses. For example, not only are they stable towards splitting off of hydrogen cyanide, but under hydrolytic conditions, such as occur in soil, they can be degraded, with the assistance of soil bacteria, without hydrocyanic acid being liberated. They can therefore be used as nitrogen fertilisers with a long-term action. Furthermore, substances to be used according to the invention that contain ions or salts with appropriate ions can be used to supply plants with various macronutrients and/or micronutrients. Those substances which are charged with acids, for example nitric acid or phosphoric acid, or with ammonium salts are particularly valuable fertilisers, since they make both organically bonded nitrogen and inorganic nutrients available to plants. In addition, the substances to be used according to the invention are distinguished by a high bonding capacity for harmful substances occurring in soil, for example undesired heavy metal ions. Moreover, they can be used as soil-improving agents and for other purposes in agriculture and horticulture. The invention thus represents a valuable enrichment of the art.

Preferred carbonyl compounds which the products to be used according to the invention contain in a condensed form are aldehydes, ketones and keto esters with reactive carbonyl groups. Aldehydes which may be mentioned in particular are formaldehyde, acetaldehyde, isobutyraldehyde, chloral, hydroxyethylaldehyde, hydroxypivalaldehyde, acrolein, crotonaldehyde, glyoxal, methylglyoxal, furfurol, hydroxymethylfurfurol, glucose, salicylaldehyde, hydroxyacetaldehyde, glyceraldehyde and other aldehydes which are formed from formaldehyde under the conditions of the synthesis of formose. Formaldehyde is particularly preferred.

Ketones which may be mentioned in particular are dihydroxyacetone and cyclohexanone; ethyl acetoacetate may be mentioned as an example of a keto ester.

The structural defects contained in the stabilised azulmic acids according to the invention are defined by the formulae $(F_1)$ and $(F_2)$. In the formula $(F_1)$, R preferably represents hydrogen, ammonium or one equivalent of a cation of a metal from main groups I and V or from subgroups I to VIII of the Periodic Table, examples which may be mentioned being the cations of lithium, sodium, potassium, beryllium, magnesium, calcium, strontium, barium, aluminium, thallium, tin, bismuth, copper, silver, gold, zinc, cadmium, titanium, zirconium, chromium, manganese, iron, cobalt, nickel, platinum and palladium. R furthermore preferably represents one equivalent of a protonated alkylamine with 1 to 6 carbon atoms, a protonated dialkylamine with 1 to 6 carbon atoms per alkyl group, a protonated trialkylamine with 1 to 6 carbon atoms per alkyl group, a protonated hydroxyalkylamine with 1 to 6 carbon atoms, a protonated di-(hydroxyalkyl)-amine with 1 to 6 carbon atoms per hydroxyalkyl group, a protonated tri-(hydroxyalkyl)-amine with 1 to 6 carbon atoms per hydroxyalkyl group, a protonated cycloalkylamine with 3 to 8 carbon atoms, a protonated alkylenediamine with 2 to 6 carbon atoms, a protonated guanidine, melamine or dicyandiamide or of a protonated, saturated or unsaturated heterocyclic nitrogen base with 5 to 7 ring members and 1 to 3 nitrogen atoms in the heterocyclic ring, and also represents those cations which are formed by quaternisation, for example permethylation, of the abovementioned basic nitrogen compounds. Particularly preferred nitrogen bases in this context are methylamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, pyrazole, 1,2,4-triazole, 1,2,3-triazole, 2-ethylimidazole and aminotriazole. R also preferably represents a trialkylsulphonium cation, in particular the triethylsulphonium cation.

By acid addition salts of azulmic acid which are stabilised by condensation with carbonyl compounds there are to be understood those salts which are formed by addition of a proton of an inorganic or organic acid onto an amino group or another suitable group in a stabilised azulmic acid. Preferred inorganic acids here are hydrogen halide acids, such as hydrofluoric acid, hydrochloric acid and hydrobromic acid; phosphorus acids, such as phosphoric acid, phosphorous acid, dialkylphosphoric acids, for example dibutylphosphoric acid, polyphosphoric acids with molecular weights from 6,000 to 40,000 and phospholine oxidephosphonic acids, for example those of the formulae

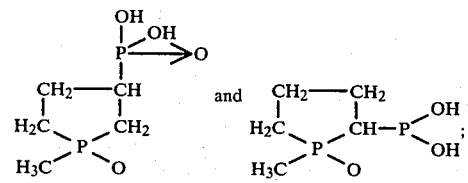

nitric acid; and acids derived from sulphur, such as sulphuric acid and sulphonic acids, examples which may be mentioned being ethylsulphonic acid, p-toluenesulphonic acid and naphthalene-1,5-disulphonic acid. Preferred organic acids are saturated or unsaturated carboxylic acids, such as acetic acid, propionic acid, 2-ethylcaproic acid, acrylic acid, methacrylic acid, oleic acid and ricinoleic acid; halogenocarboxylic acids, such as chloroacetic acid, dichloroacetic acid and trichloroacetic acid; dicarboxylic acids, such as maleic acid, fumaric acid and succinic acid, and half-esters derived therefrom; and hydroxycarboxylic acids, such as hydroxyacetic acid, tartaric acid, citric acid and salicylic acid.

By azulmic acid complex compounds stabilised by condensation with carbonyl compounds, there are to be understood, preferably, complexes of stabilised azulmic acids and metal compounds or ammonium salts. Possible metal compounds here are, in particular, salts, acids, hydroxides and oxides of metals of main groups II to V or of sub-groups I to VIII of the Periodic Table. Examples which may be mentioned are calcium chloride, acetate, nitrate, hydroxide and oxide, strontium nitrate, barium chloride and acetate, borates, aluminium acetate and formate, thallium sulphate, thallium nitrate, silicon tetrachloride, sodium and potassium silicate, tin(II) chloride, bismuth(III) hydroxide and Bismuth(III) nitrate, copper sulphate, nitrate and acetate, silver nitrate, aurichlorohydric acid, zinc chloride and acetate, cadmium chloride, titanium tetrachloride and tetrabutylate, zirconium sulphate, vanadates, chromium(III) chloride, molybdates, tungstates and hetero-polyacids thereof, manganese(II) sulphate and acetate, iron(II) sulphate and acetate and iron(III) chloride, cobalt chloride, nickel chloride, hexachloroplatinic acid and palladium-(II) chloride. Possible ammonium salts are, in particular, ammonium nitrate and ammonium acetate.

Additives which the products according to the invention can contain are naturally occurring organic substances and products obtained therefrom, naturally occurring inorganic substances and products obtained therefrom, synthetic organic products, synthetic inorganic products and/or mixed products consisting of organic and inorganic products.

Preferred naturally occurring organic substances and products obtained therefrom are, in this case, wood flour, lignin powder, lignin-sulphonic acids, ammonified lignin-sulphonic acids, humus, humic acids, ammonified humic acids, peat, proteins and degradation products, for example hydrolysis products, of yeasts, algal material (alginates), polypeptides, such as wool and gelatin, fish-meal and bone-meal, and furthermore aminoacids, oligopolypeptides, pectins, monosaccharides, such as glucose and fructose, disaccharides, such as sucrose, oligosaccharides, polysaccharides, such as starch and cellulose, and also hemicelluloses, homogenised materials of vegetable and animal origin, active charcoals and ashes which are obtainable by partial oxidation, complete oxidation or combustion of organic substances formed by photosynthesis or of customary fuels, fir ash, broom ash, ash of Serbian spruce, oak ash, birch ash, beech ash, willow ash and tobacco leaf ash being mentioned in particular.

Preferred naturally occurring inorganic substances and products obtained therefrom are silicates, such as aluminium silicates, calcium silicates, magnesium silicates and alkali metal silicates, furthermore sea sand and other naturally occurring silicon dioxides, silicic acids, in particular disperse silicic acids, silica gels, and also clay minerals, mica, carbonates, such as calcium carbonate, phosphorite and phosphates, such as calcium phosphate and ammonium magnesium phosphate, sulphates, such as calcium sulphate and barium sulphate, and in addition oxides, such as zirconium dioxide, nickel oxide, palladium oxide, barium oxide, disperse antimony oxides and aluminium oxides, such as bauxite, and further, fly ashes and the most diverse types of carbon black.

Preferred synthetic organic products are aminoplast condensates, in particular those of urea, dicyandiamide, melamine or oxamide and aldehydes, such as formaldehyde, acetaldehyde, isobutyraldehyde, hydroxypivaldehyde, crotonaldehyde, hydroxyacetaldehyde, furfurol, hydroxymethylfurfurol, glyoxal and glucose, particular products which may be mentioned being condensation products of urea and formaldehyde, urea and glyoxal, urea and acetaldehyde, urea and isobutyraldehyde, urea and crotonaldehyde, urea and hydroxypivalaldehyde and 2-oxo-4-methyl-6-ureido-hexahydropyrimidine, which is a known condensation product of 1 mol of crotonaldehyde and 2 moles of urea and is formed from the intermediate product crotonylidene-diurea by saturation of the double bond and has the formula

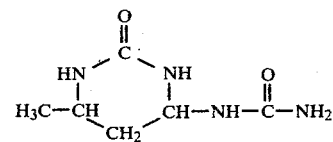

Further preferred synthetic organic products are plastics, such as polyamide powders, polyurethane powders and polycarbodiimides, and furthermore polymeric quinones, addition products and condensation products of quinones, in particular benzoquinone, with amines or ammonia, and also with aldehydes, in particular formaldehyde, crosslinked gelatin, synthetic agents for improving soil, such as, for example, the product known as Hygromull (=urea/formaldehyde resin flakes), furthermore synthetic sugars, for example, formose sugar mixtures prepared from formaldehyde, and also sparingly soluble cane sugar complexes, such as the sucrose-calcium oxide complex having the composition 1 mol of sucrose to 3 mols of calcium oxide, and finally organic ammonium salts, such as ammonium carbaminate, and other organic nitrogen compounds, such as hexamethylenetetramine and hexahydrotriazines.

Preferred synthetic inorganic products which may be mentioned are fertilisers, such as superphosphate, basic slag, Rhenania phosphate, phosphorite, calcium cyanamide, calcium ammonium nitrate, Leuna saltpeter, potassium phosphates, potassium nitrate and ammonium nitrate; pigments, such as iron oxides and titanium dioxides; metal oxides and metal hydroxides, such as calcium oxide, calcium hydroxide, bismuth hydroxide, manganese hydroxide and magnesium hydroxide, hydroxides which are prepared in situ being particularly preferred; synthetic silicic acids, in particular silicic acid prepared in situ, and salts thereof, and also waterglass; and salts such as cobalt molybdate, ammonium carbonate and calcium carbonate.

Preferred mixed products consisting of inorganic and organic products are neutral, basic or acid soils, naturally occurring agents for improving soil, biologically active garden mould and sewage sludges.

The additives can be physically and/or chemically bonded to the stabilised azulmic acid in an amount of from 1 to 95 percent by weight, preferably from 5 to 90 percent by weight. In some cases, the stabilised azulmic acids are coated by the additives. Stabilised azulmic acids coated, for example micro-encapsulated, by polycarbodiimides may be mentioned as an example of products of this type.

The azulmic acids, stabilised by condensation with carbonyl compounds, which can be used according to the invention, acid addition salts and complex compounds thereof and mixed products thereof with additives have not hitherto been disclosed. However, they can be prepared in a simple manner by several processes. Thus, the azulmic acids, stabilised by condensation with carbonyl compounds, which can be used according to the invention, acid addition salts and complex compounds thereof and mixed products thereof with additives are obtained by a process in which:

(1) modified azulmic acids optionally containing additives and containing from 0.5 to 55 percent by weight of ionic groups of the general formula

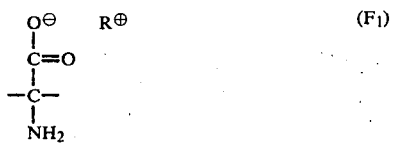

in which R has the meaning stated above, and containing from 0.5 to 15 percent by weight of groups of the formula

are subjected to a condensation reaction with carbonyl compounds in an aqueous medium, optionally in the presence of additives, or in which (2) acid addition salts or complex compounds, optionally containing additives, of modified azulmic acids containing from 0.5 to 55 percent by weight of ionic groups of the general formula

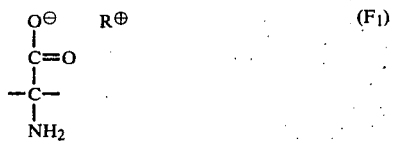

in which R has the meaning stated above, and containing from 0.5 to 15 percent by weight of groups of the formula

are subjected to a condensation reaction with carbonyl compounds in an aqueous medium, optionally in the presence of additives, or in which (3) azulmic acids which are almost free from structural defects are subjected to a condensation reaction with carbonyl compounds in an aqueous medium, optionally in the presence of additives, or in which (4) hydrocyanic acid is polymerised under hydrolysing conditions in an aqueous medium with the aid of basic catalysts, optionally in the presence of additives, and the reaction products are then subjected to a condensation reaction with carbonyl compounds, without prior isolation, in an aqueous medium, optionally in the presence of additives, or in which (5) modified azulmic acids containing from 0.5 to 55 percent by weight of ionic groups of the general formula

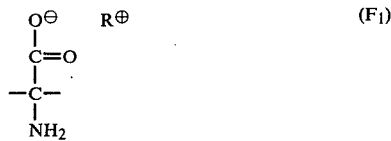

in which R has the meaning stated above and containing from 0.5 to 15 percent by weight of groups of the formula

are reacted with bases in an aqueous medium, the cation is optionally replaced by treatment with metal salts and the products are then subjected to a condensation reaction with carbonyl compounds in an aqueous medium, optionally in the presence of additives, in an aqueous medium, or in which (6) modified azulmic acids are treated with organic or inorganic acids in an aqueous medium and the products are then subjected to a condensation reaction with carbonyl compounds in an aqueous medium, optionally in the presence of additives, or in which (7) azulmic acids which are almost free from structural defects are subjected to a condensation reaction with carbonyl compounds in an aqueous medium, in the presence of hydrolytically degradable naturally occurring substances and in the presence of an acid, and the products prepared by the processes mentioned are then optionally treated with an acid or base.

In the present case, by modified azulmic acids which are used as starting materials in some of the processes indicated above, there are to be understood those hydrocyanic acid polymers which contain ionic and nonionic groups of the formulae

and

Groups of this type originate from nitrile groups, which are present in azulmic acid and can be regarded as terminal points for the cyclising nitrile polymerisation.

In the ideal case, the transition of a nitrile group of azulmic acid into a corresponding carboxyl group can be illustrated, by means of formulae, as follows:

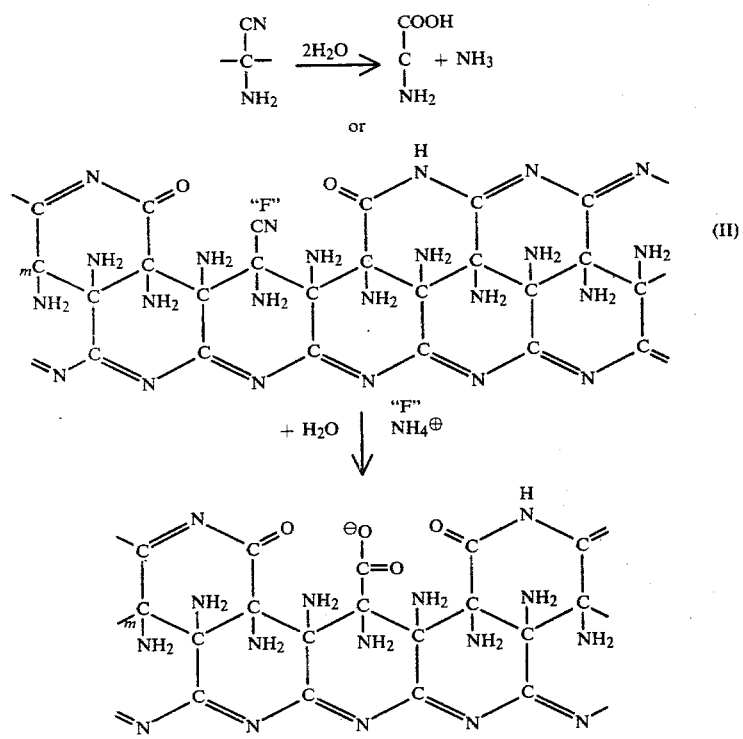

It is, of course, also possible to form amide, imide, amidine or lactam groups from nitrile groups. Thus, for example the formation of amide groups can be represented by the equation which follows.

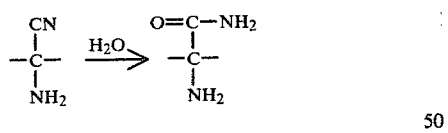

Ionic or non-ionic groups of the above formulae are produced not only at the nitrile groups which are already present in the polymer employed, but also at those nitrile groups which are formed by catalytic decyclisation reactions. Furthermore, various other hydrolysis reactions are responsible for the formation of structural defects. For example, a

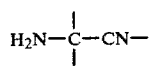

group, which is to be regarded as an α-aminonitrile in the azulmic acid molecular structure, can be converted into a carbonyl group by splitting off hydrogen cyanide and a subsequent topochemical hydrolysis reaction according to the equation which follows:

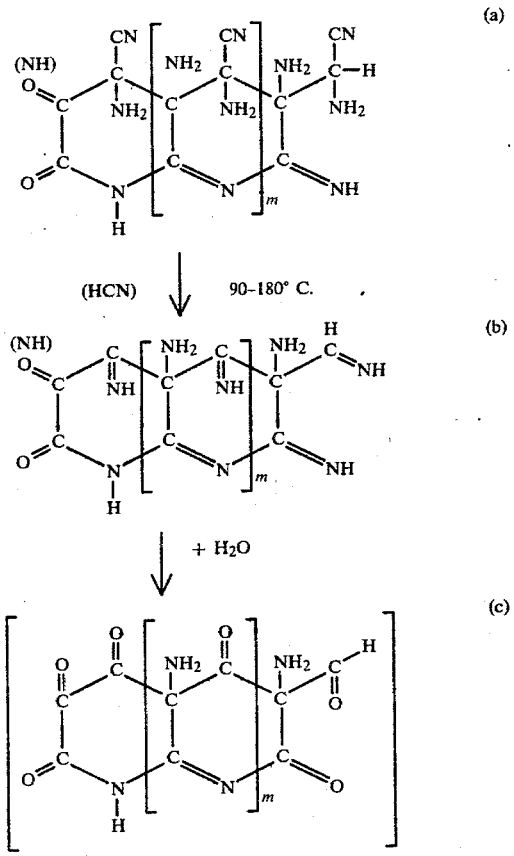

In the following text, the ionic groups of the general formula

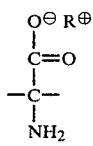

are designated $F_1$ structural defects and the groups of the formula

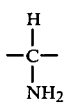

are designated $F_2$ structural defects.

The $F_2$ structural defects are formed from the $F_1$ structural defects, in which R represents hydrogen or another suitable ion, according to the equation which follows:

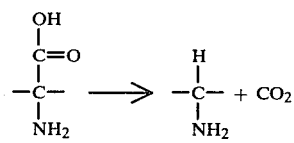

or, in the azulmic acid molecular unit, the modification of the structural defects by a decarboxylation reaction

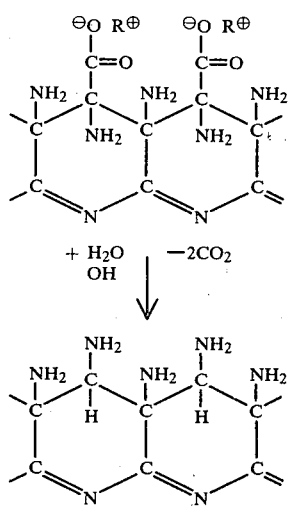

results in an increase in the concentration of $NH_2$ groups, a loss in acidity, and an increase in basicity.

As can be seen from the formula (II) indicated above, each $F_1$ structural defect produced is directly adjacent to an amino group in the α-position and to an amino group in the β-position. Thus, at $F_1$ structural defects of the formula

```
     OH                "β-position"
     |              ↗
     C=O
     |         NH2
   — C —   C
    /   \ /
         C
       NH2   |
              ↓
         "α-position"
``` either intramolecular zwitterionic salts of the formula

```
            Oʘ
            ⋮
       C=O  ⋮
       |    ⋮
     — C    ⋮
        \   ⋮
         C
         |  NH3⊕
```

(= 5-membered rings)

are formed, or intermolecularly crosslinked salts, represented ideally as follows:

```
    ∧∧∧
       \
        C=O
        |
        Oʘ
        NH3⊕
       /
    ∧∧∧
``` are formed between several azulmic acid molecules. The formation of intramolecular salts, that is to say 5-membered rings, is preferred.

Since the formation of the $F_1$ structural defects is coupled with the liberation of ammonia and the formation of the $F_2$ structural defects is coupled with the liberation of carbon dioxide, the amount of ammonia and carbon dioxide evolved is a quantitative measure of the number of structural defects produced. The quotient of the molar amount of ammonia evolved and the molar amount of carbon dioxide evolved provides information on the ratio of $F_1$ structural defects to $F_2$ structural defects.

In the following text, the content of structural defects, in percent by weight, in the modified azulmic acids is in each case determined by relating the equivalent weight of the structural defect concerned (=ionic or nonionic grouping $F_1$ or $F_2$) to the corresponding weight (100 g) not converted into an ionic or non-ionic grouping. Thus, for example, the concentration of structural defects for an $F_1$ structural defect in which R represents hydrogen is calculated from the particular molar amount of ammonia formed and the fact that the associated ionic grouping of the formula

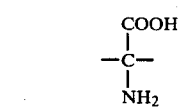

has an equivalent weight of 73.

In an analogous manner, the content of $F_2$ structural defects is calculated from the particular molar amount of carbon dioxide evolved and the fact that the relevant grouping of the formula

has an equivalent weight of 29.

The common characteristic of processes (1) to (7) for the preparation of the substances which can be used according to the invention is the condensation of amino, amide, amidine or lactam groups, present in the azulmic acids employed, with carbonyl groups. If, for example, formaldehyde is used as the carbonyl component, condensation thereof with an amino group of an azulmic acid can be illustrated, for example, by the equation which follows:

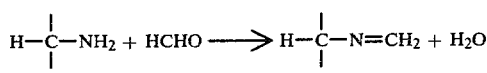

Reactions which lead to methylol compounds, N,N-methylene compounds or compounds with methylene ether linkages ($>$N—CH$_2$—O—CH$_2$—N$<$) can proceed in addition to the formation of azomethine groups shown by way of the equation. Azomethine groups (—N=CH$_2$) readily crosslink to give hexahydrotriazine structures, partial formation of hexahydropyrimidine derivatives by intramolecular condensation of cis-amino groups present in the α-position also being possible.

In process (1), modified azulmic acids optionally containing additives and containing from 0.5 to 55 percent by weight of ionic groups of the formula

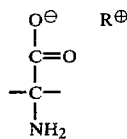 (F$_1$)

and containing from 0.5 to 15 percent by weight of groups of the formula

 (F$_2$)

are subjected to a condensation reaction with carbonyl compounds in an aqueous medium, optionally in the presence of additives.

In the formula (F$_1$), R preferably represents those substituents which have already been mentioned as preferred for R in connection with the description of the substances to be used according to the invention.

The modified azulmic acids to be used as starting materials in process (1) (=azulmic acids containing structural defects) can contain 1 to 95 percent by weight, preferably 5 to 90 percent by weight, of additives. Possible additives here are naturally occurring organic substances and products obtained therefrom, naturally occurring inorganic substances and products obtained therefrom, synthetic organic products, synthetic inorganic products and/or mixed products consisting of organic and inorganic products. These include, preferably, those materials which have already been mentioned as preferred in connection with the description of the additives optionally present in the substances to be used according to the invention.

The modified azulmic acids optionally containing additives, required as starting materials are hitherto unknown. However, they can be prepared in a simple manner by various processes. Thus, the products concerned, which are the subject of a separate patent application, are obtained by a process in which (A) azulmic acid, which is known and almost free from structural defects, in an aqueous medium,
  (a) is treated with organic or inorganic acids, optionally in the presence of additives, or
  (b) is treated with bases or basic salts, optionally in the presence of additives, or
  (c) is treated with water in the neutral range, or
  (d) is treated with vegetable ashes, catalytically active naturally occurring substances and/or fertilisers, or
  (e) is treated with metal salts, optionally in the presence of oxidising agents and optionally in the presence of organic acids, or
  (f) is treated with metal salt complexes of stabilised azulmic acids, or
  (g) is treated with oxidising agents, or in which (B) hydrocyanic acid is polymerised under hydrolysing conditions in an aqueous medium with the aid of basic catalysts, optionally in the presence of additives, and the products prepared by the processes mentioned are then optionally treated with an acid or base.

Hydrocyanic acid polymers which are almost free from structural defects, so-called azulmic acids, are used as starting materials in the preparation of the modified azulmic acids, optionally containing additives, by process (A), variants (a) to (g). Azulmic acids of this type which are almost free from structural defects are already known (see Houben-Weyl, volume 8 (1952), page 261; German Pat. No. 662,338; and DT-OS (German Published No. 949,060).

According to variant (a) of process (A), the azulmic acids which are almost free from structural defects are treated with inorganic or organic acids, optionally in the presence of additives. Preferred inorganic or organic acids for this treatment are all those which have already been listed as preferred in the description of the stabilised acid-addition products of azulmic acid. Additives which can be used are naturally occurring organic substances and products obtained therefrom, naturally occurring inorganic substances and products obtained therefrom, synthetic organic products, synthetic inorganic products and/or mixed products consisting of organic and inorganic products. These include, preferably, all those materials which have already been mentioned as preferred in connection with the description of the additives optionally present in the substances to be used according to the invention.

Variant (a) of process (A) is carried out in an aqueous medium, preferably in water. However, it is also possible to replace some of the water by other diluents, such as hydrogen sulphide or alcohols, methanol and ethanol being mentioned in particular.

In the case of variant (a) of process (A), the reaction temperatures can be varied within a substantial range.

In general, the reaction is carried out between 0° C. and 200° C., preferably between 20° C. and 120° C.

In general, the reaction according to variant (a) of process (A) is carried out under normal pressure. However, it is also possible to carry out the reaction under increased pressure.

In carrying out variant (a) of process (A), a catalytic amount or 1 to 4 moles of an inorganic or organic acid and optionally an amount of additives such that the proportion thereof in the end product is between 1 and 95 percent by weight, preferably between 5 and 90 percent by weight, are employed per mole (relative to the molecular unit

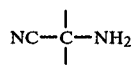

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

If nitric acid is used for producing structural defects in carrying out variant (a) of process (A), and the reaction temperature is thereby kept relatively low, preferably between 20° to 30° C., traces of hydrocyanic acid split off are oxidised, whilst at the same time addition reactions of nitric acid with the amino groups of the modified azulmic acids take place extremely readily, and types of modified azulmic acids which contain ionic groups of the formula

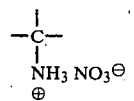

on their amino groups are obtained by a simple topochemical reaction.

In this manner, about 0.5 mol of nitric acid is bonded per 100 parts by weight of modified azulmic acid. Depending on the type of process and the reaction time of the dilute nitric acid on the modified azulmic acids, about 30 to 50% of the amino groups present are available for salt formation. Traces of free nitric acid can advantageously be converted into ammonium nitrate by gassing the products with gaseous ammonia, the reaction advantageously being carried out in the solid phase in a fluidised bed.

If phosphoric acid or phosphorous acid is used for producing structural defects in carrying out variant (a) of process (A), and the reaction temperatures are kept relatively low, preferably between 20° C. and 55° C., decarboxylation reactions and the production, associated therewith, of $F_2$ structural defects are largely suppressed. At the same time, the acids are bonded extremely readily by the amino group of the modified azulmic acids in a heterogeneous reaction. In this manner, about 0.2 mol of phosphoric acid, or about 0.5 mol of phosphorous acid, are bonded by about 100 parts by weight of modified azulmic acid within five minutes. The salts formed are almost water-insoluble. Small amounts of free phosphoric acid or phosphorous acid contained in the products can advantageously be converted into the corresponding ammonium salts by treating the products with gaseous ammonia, the reaction advantageously being carried out in the solid phase in a fluidised bed.

In a particular embodiment of variant (a) of process (A), the azulmic acid is reacted with 0.2 to 80% strength phosphoric acid or phosphorous acid in the presence of naturally occurring hydrolytically degradable substances, for example celluloses, hemicelluloses, sugars, lignin, polymeric quinones, wood flour, vegetable material, polypeptides, such as gelatin and wool, and furthermore yeast proteins, algal compositions and peat compositions. In this embodiment, the structural defects are produced with simultaneous hydrolytic degradation of the particular naturally occurring substances employed. If polypeptides are used, these are split into amino-acid mixtures. Because of its numerous amino groups, the azulmic acid bonds about 0.3 to 0.4 mol of phosphoric acid or phosphorous acid, whilst the phosphoric acid salts of the aminoacids or those of the oligopolypeptides, or the other low-molecular degradation products of the naturally occurring substances employed are frequently fixed by the azulmic acid matrix in a large amount, even when they are water-soluble. Excess acid, for example phosphoric acid, can be precipitated as calcium phosphate on the azulmic acid matrix by adding calcium hydroxide. If hydrolysed sugars and oligosaccharides are present in this case, they are absorbed on the azulmic acid in the form of their calcium complexes, which are usually sparingly soluble. The process products obtained by this variant of process (A) can be stored for a relatively long period without unpleasant odours being formed, as is otherwise the case when naturally occurring substances such as oligopeptides, peptide/sugar mixtures and the like are degraded by biological processes.

A further particular embodiment of variant (a) of process (A) consists of a procedure in which, in order to produce the structural defects, 1 to 4 mols of 1 molar phosphoric acid solution are employed and the excess phosphoric acid is then precipitated as calcium phosphate by adding calcium chloride, as magnesium phosphate by adding magnesium chloride or as ammonium magnesium phosphate by adding ammonium and magnesium salts. Additives of the most diverse nature can also be used at the same time during this procedure. Particularly preferred additives in this case are vegetable ashes, insoluble polyquinones, addition products or condensation products of benzoquinone and amines, in particular ammonia, and furthermore ligninsulphonic acid, humic acids, diverse fly ashes, bauxite, aluminium oxide, cobalt molybdate, silicon dioxide, active charcoal, zirconium dioxide, nickel oxide, palladium oxide and barium oxide. Further preferred possible additives are sugars, such as cane sugar and other sugars containing no free aldehyde groups, or formose sugar mixtures prepared from formaldehyde. These very diverse types of sugars can be fixed in the channels and pores of the solid azulmic acid matrices. Furthermore, the various sugars can also be absorbed onto the azulmic acids in the form of their calcium complexes, which in most cases are sparingly soluble.

According to variant (b) of process (A), the azulmic acids which are almost free from structural defects are treated with bases or basic salts, optionally in the presence of additives. Both organic and inorganic bases can be used as the bases here. Organic bases which can preferably be used are ammonia, alkylamines with 1 to 6 carbon atoms, dialkylamines with 1 to 6 carbon atoms per alkyl group, trialkylamines with 1 to 6 carbon atoms per alkyl group, hydroxyalkylamines with 1 to 6 carbon atoms, di-(hydroxyalkyl)-amines with 1 to 6 carbon atoms per hydroxyalkyl group, tri-(hydroxyalkyl)-amines with 1 to 6 carbon atoms per hydroxyalkyl group and alkyl-hydroxyalkylamines with 1 to 6 carbon atoms in the alkyl group and in the hydroxyalkyl group, and cycloalkylamines with 3 to 8 carbon atoms, alkylenediamines with 2 to 6 carbon atoms, guanidine, melamine, dicyandiamide, saturated or unsaturated heterocyclic nitrogen bases with 5 to 7 ring members and 1 to 3 nitrogen atoms in the heterocyclic ring, and those bases which are derived from the compounds formed by quaternisation, for example permethylation, of the abovementioned nitrogen compounds, and furthermore those bases which are derived from trialkylsulphonium compounds. Particularly preferred nitrogen bases in this context are ammonia, methylamine, methylethanolamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, pyrazole, 1,2,4-triazole, 1,2,3-triazole, 2-ethylimidazole, aminotriazole and triethylsulphonium hydroxide.

Inorganic bases which can preferably be used are alkali metal hydroxides and alkaline earth metal hydroxides. Lithium hydroxide, sodium hydroxide, potassium hydroxide, magnesium hydroxide, calcium hydroxide, strontium hydroxide and barium hydroxide may be mentioned in particular.

Preferred possible basic salts for carrying out variant (b) of process (A) are alkali metal sulphides, such as sodium sulphide, sodium bisulphide and potassium bisulphide, and further sodium thiosulphate, ammonium thiosulphate, ammonium polysulphides, calcium bisulphide, calcium thiosulphate and calcium cyanamide, and also potassium carbonate, potassium bicarbonate, potassium cyanate and waterglass (sodium waterglass or potassium waterglass). Mixtures of ammonia and sodium thiosulphate, ammonium thiosulphate, sodium bisulphide, sodium sulphide and/or ammonium polysulphides are also particularly suitable for producing structural defects by this method.

Additives which can be used in carrying out variant (b) of process (A) are naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of the additives optionally present in the substances to be used according to the invention.

Variant (b) of process (A) is carried out in an aqueous medium or in an aqueous-alcoholic medium. A preferred reaction medium is water, or a mixture of water and an alcohol, such as methanol or ethanol. However, it is also possible to replace some of the water by hydrogen sulphide. If the reaction is carried out in the presence of hydrogen sulphide or in the presence of reagents which release hydrogen sulphide under the reaction conditions and the reaction temperature is kept between 70° C. and 100° C., small amounts of hydrocyanic acid split off are converted into carbon oxysulphide and ammonia, structural defects simultaneously being produced.

The reaction temperatures can be varied within a substantial range in the case of variant (b) of process (A). In general, the reaction is carried out at temperatures between 0° C. and 200° C., preferably between 20° C. and 150° C.

In general, the reaction according to variant (b) of process (A) is carried out under normal pressure. However, it is also possible to carry out the reaction under increased pressure. The latter is particularly advisable if gaseous ammonia is used for producing structural defects.

In carrying out variant (b) of process (A), a catalytic amount, or 1 to 4 moles, preferably 1 to 2 moles, of base or basic salt and optionally an amount of additives such that their proportion in the end product is between 1 and 95 percent by weight, preferably between 5 and 90 percent by weight, are employed per mole (relative to the molecular unit

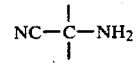

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried. The base still contained in the end product can also advantageously be neutralised by adding a corresponding amount of acid, such as, for example, phosphoric acid, so that the products formed then also contain the particular salts.

If an excess of acid is used in this neutralisation, acid addition salts of the particular modified azulmic acids are formed.

If strong bases are used for producing structural defects in carrying out variant (b) of process (A), azulmic acids with particularly high contents of structural defects can be prepared after relatively long reaction times. The products formed have a polyelectrolyte character. In the case where potassium hydroxide is employed as the base, the ideal course of a reaction of this type can be illustrated by the equation which follows.

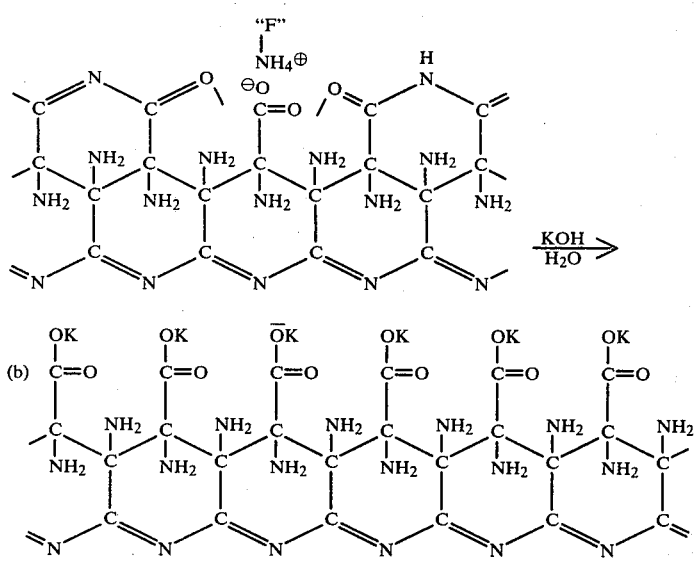

If an excess of concentrated (25% strength) ammonia solution is used in this variant (b) of process (A), and the reaction is carried out at room temperature, after a reaction time of about 6 to 20 hours, modified azulmic acids which contain a high proportion of structural defects and in which some of the carboxyl groups are present in the form of ammonium carboxylate groups are obtained. However, it is also possible to convert modified azulmic acids in which free carboxyl groups are present into the corresponding products containing the ammonium salt by gassing with ammonia in a fluidised bed.

In a particular embodiment of variant (b) of process (A), the azulmic acid is reacted with gaseous ammonia under pressure in an aqueous-alcoholc medium at temperatures between 120° and 140° C. Modified azulmic acids which have a high content of ammonium carboxylate groups are formed in this procedure. The free amino groups contained in these products are capable of additionally bonding acids, for example phosphoric acid, so that the end products contain ammonium ions and acid radicals side by side.

In a further particular embodiment of variant (b) of process (A), the azulmic acid is reacted with catalytic amounts, or even with larger amounts, of waterglass—about 1 to 4 mols of waterglass per 100 g of azulmic acid—in a topochemical reaction. In this procedure, modified azulmic acids charged with potassium ions or sodium ions are formed, the saponifiable nitrile groups of which act as latent acids and precipitate silicic acids. The latter are absorbed, in fine distribution, onto the reaction products. Any excess sodium silicate or potassium silicate present can be precipitated by simple gassing of the particular dispersions with carbon dioxide, or can be precipitated in a particularly advantageous manner by adding phosphoric acid or calcium chloride mixed with potassium phosphates or sodium phosphates or calcium silicates.

According to variant (c) of process (A), the azulmic acids which are almost free from structural defects are treated with distilled water in the neutral range, preferably at pH values between 6 and 6.5, for 4 to 60 hours. The reaction temperatures can be varied within a substantial range in this procedure. In general, the reaction is carried out at temperatures between 60° C. and 150° C., preferably between 80° C. and 120° C. In general, the reaction is carried out under normal pressure. However, it is also possible to carry it out under increased pressure. Isolation of the reaction products is also carried out by customary methods in this variant of process (A). In general, a procedure is followed in which, after the reaction has ended, the reaction mixture is filtered and the solid product obtained is dried.

According to variant (d) of process (A), the azulmic acids which are almost free from structural defects are treated with vegetable ashes, catalytically active naturally occurring substances and/or fertilisers.

Possible vegetable ashes in this procedure are the combustion products of the most diverse substances formed by photosynthesis. Preferred ashes which may be mentioned are the ashes of fir, broom, Serbian spruce, oak, birch, beech, willow, tobacco leaves and tobacco stalks, and furthermore of cereals, such as rye or barley, and also of fungi, for example edible mushrooms, and of apples, carrots, potato tubers and leaves of white cabbage. It is particularly advantageous to use potassium-rich varieties of ash. By ashes there are also to be understood here mixtures of various vegetable ashes.

Preferred catalytically active naturally occurring substances are biologically active garden mould and basic or acid soils of the most diverse nature.

All the commercially available fertilisers can be used as fertilisers in the production of structural defects according to variant (d) of process (A). Preferred fertilisers which may be mentioned are varieties of peat charged with plant nutrients, superphosphate, basic slag, Rhenania phosphate, phosphorite, calcium cyanamide, calcium ammonium nitrate, Leuna saltpeter, potassium phosphates, potassium nitrate and ammonium nitrate.

Variant (d) of process (A) is carried out in an aqueous medium, preferably in water. However, it is also possible to replace some of the water by other diluents, such as hydrogen sulphide or alcohols, methanol and ethanol being mentioned in particular.

The reaction temperatures can be varied within a substantial range in the case of variant (d) of process (A). In general, the reaction is carried out between 50° C. and 150° C., preferably between 80° C. and 120° C.

In general, the reactions according to variant (d) of process (A) are carried out under normal pressure. However, it is also possible to carry out the reactions under increased pressure.

In carrying out variant (d) of process (A), the azulmic acid is reacted with catalytic or even with larger amounts of vegetable ashes, catalytically active naturally occurring substances and/or fertilisers. If the vegetable ashes, catalytically active naturally occurring substances and/or fertilisers are used in a relatively large amount, these substances are not only used for producing structural defects, but they are also simultaneously contained, as additives, in the products formed. The mixture is worked up by customary methods. In general, a procedure is followed in which, after the reaction has ended, the reaction mixture is filtered and the solid product obtained is appropriately washed and dried.

According to variant (e) of process (A), the azulmic acids which are almost free from structural defects are treated with metal compounds, optionally in the presence of oxidising agents and optionally in the presence of organic acids.

Preferred metal compounds here are salts of metals of main groups II to V or of sub-groups I to VIII of the Periodic Table. Examples which may be mentioned are calcium chloride, acetate and nitrate, strontium nitrate, barium chloride and acetate, aluminium acetate and formate, thallium sulphate and nitrate, silicon tetrachloride, sodium silicate and potassium silicate, tin(II) chloride, bismuth(III)nitrate, copper sulphate, nitrate and acetate, silver nitrate, aurichlorohydric acid, zinc chloride and acetate, cadmium chloride, titanium tetrachloride and tetrabutylate, zirconium sulphate, chromium-(III) chloride, manganese(II) sulphate and acetate, iron-(II) sulphate and acetate and iron(III) chloride, cobalt chloride, nickel chloride, hexachloroplatinic acid and palladium(II) chloride. Further metal compounds which can preferably be used are the acids of vanadium, molybedenum and tungsten, and heteropolyacids thereof.

Possible oxidising agents which can be present in carrying out variant (e) of process (A) are all the customary agents which release oxygen. Air and nitric acid can preferably be used.

Preferred organic acids which can be present in carrying out variant (e) of process (A) are saturated and unsaturated, optionally substituted carboxylic acids. Formic acid, acetic acid, propionic acid, 2-ethylcaproic acid, acrylic acid, methacrylic acid, oleic acid, ricinoleic acid, chloroacetic acid, dichloroacetic acid, trichloroacetic acid and hydroxyacetic acid may be mentioned in particular.

In general, variant (e) of process (A) is carried out in an aqueous medium, preferably in water. However, it is also possible to replace some of the water by other diluents, such as acids or organic hydrocarbons, formic acid and xylene being mentioned in particular.

The reaction temperatures can be varied within a substantial range in the case of variant (e) of process (A). In general, the reaction is carried out between 0° C. and 150° C., preferably between 20° C. and 120° C.

In general, the reaction according to variant (e) of process (A) is carried out under normal pressure. However, it is also possible to carry out the reaction under increased pressure.

In carrying out variant (e) of process (A), a catalytic amount, or even a larger amount—about 1 to 2 mols—of metal compound and optionally a catalytic amount, or even a larger amount, of oxidising agent and optionally a catalytic amount, or even a larger amount, of organic acid are employed per mole (relative to the molecular unit

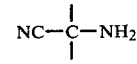

with the equivalent weight 54) of azulmic acid. The mixture is worked up by customary methods. In general, a procedure is followed in which, after the reaction has ended, the reaction mixture is filtered and the solid product thereby obtained is appropriately washed and dried.

Any excess metal compounds present in the products obtained can be precipitated in the form of finely divided precipitates, which are frequently sparingly soluble, by adding bases, such as ammonia, sodium hydroxide or potassium hydroxide, or by adding acids, such as phosphoric acid, depending on the metal compound.

According to variant (f) of process (A), the azulmic acids which are almost free from structural defects are treated with metal salt complexes of azulmic acids stabilised with carbonyl compounds.

The preparation of the metal salt complexes, required as starting materials, of azulmic acids stabilised with carbonyl compounds is described in connection with the preparation of the substances to be used according to the invention.

Metal salt complexes which can preferably be used in this procedure are those which are derived from those metal compounds which have already been mentioned as preferred in connection with variant (e) of process (A).

Variant (f) of process (A) is carried out in an aqueous medium, preferably in water. However, it is also possible to replace some of the water by other diluents, such as alcohols.

The reaction temperatures can be varied within a substantial range in the case of variant (f) of process (A). In general, the reaction is carried out between 0° C. and 150° C., preferably between 20° C. and 120° C.

In general, the reaction according to variant (f) of process (A) is carried out under normal pressure. However, it is also possible to carry out the reaction under increased pressure.

In carrying out variant (f) of process (A), 0.5 to 1 mole of metal salt complex of stabilised azulmic acid is preferably employed per mole (relative to the molecular unit

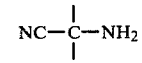

with the equivalent weight 54) of azulmic acid which is almost free from structural defects. The mixture is worked up by customary methods. In general, a procedure is followed in which, after the reaction has ended, the reaction mixture is filtered and the solid product thus obtained is appropriately washed and dried.

Any excess metal compounds present in the products which can be prepared according to variant (f) of process (A) can be precipitated in the form of finely divided precipitates, which are frequently sparingly soluble, by adding bases, such as ammonia, sodium hydroxide or potassium hydroxide, or by adding acids, such as phosphoric acid, depending on the metal compound.

According to variant (g) of process (A), the azulmic acids which are almost free from structural defects are treated with oxidising agents. Possible oxidising agents here are all the customary reagents having an oxidising action. Air, oxygen, potassium permanganate, hydrogen peroxide, chromic acid and bleaching powder can preferably be used.

Variant (g) of process (A) is carried out in an aqueous medium, preferably in water. However, it is also possible to replace some of the water by other diluents, such as organic carboxylic acids, formic acid and acetic acid being mentioned in particular.

The reaction temperatures can be varied within a substantial range in the case of variant (g) of process (A). In general, the reaction is carried out between 0° C. and 150° C., preferably between 20° C. and 120° C.

In general, the reaction according to variant (g) of process (A) is carried out under normal pressure. However, it is also possible to carry out the reaction under increased pressure.

In carrying out variant (g) of process (A), a catalytic amount, or even a larger, optionally equimolar, amount, of oxidising agent is employed per mole (relative to the molecular unit

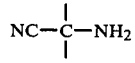

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

According to process (B), monomeric aqueous hydrocyanic acid is polymerised under hydrolysing conditions with the aid of basic catalysts, optionally in the presence of additives. Dilute aqueous hydrocyanic acid solutions are used as starting materials in this procedure. In general, solutions with a hydrocyanic acid concentration of between 10 and 30%, preferably between 15 and 25%, are used.

Possible basic catalysts for process (B) are organic and inorganic bases and basic salts of the most diverse nature. Alkali metal cyanides and alkali metal cyanates, such as sodium cyanide, potassium cyanide, sodium cyanate and potassium cyanate, and furthermore amines and ammonia, can preferably be used. Mixtures of the most diverse bases or basic salts can also advantageously be employed; a mixture of sodium cyanate and aqueous ammonia solution may be mentioned as an example.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (B). These include, preferably, all those materials which have already been mentioned as preferred in connection with the description of the additives optionally present in the substances to be used according to the invention.

Process (B) is carried out in an aqueous medium, preferably in water. However, it is also possible to replace some of the water by other diluents, such as hydrogen sulphide or alcohols, methanol and ethanol being mentioned in particular.

The reaction temperatures can be varied within a particular range in the case of process (B), it being necessary, however, for the temperature setting to be adjusted according to the particular reaction phase. In general, the procedure is first to carry out the polymerisation at temperatures between 30° C. and 70° C., preferably between 40° C. and 60° C., for 1 to 4 hours so that an approximately 60% conversion of the monomeric hydrocyanic acid is achieved. Thereafter, the polymerisation is carried out at temperatures between 70° C. and 95° C., preferably between 80° C. and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present.

In general, the reaction according to process (B) is carried out under normal pressure. However, it is also possible to carry out the reaction under increased pressure at temperatures between 120° C. and 150° C. In this procedure, relatively large amounts of structural defects can be produced in the process products in a controlled manner.

In carrying out process (B), the basic catalyst is employed in an amount such that its proportion is 1 to 15%, preferably 2 to 10%, of the monomeric hydrocyanic acid employed.

The additives are optionally added to the reaction mixture in an amount such that their proportion in the end product is between 1 and 95 percent by weight, preferably between 5 and 90 percent by weight. The mixture is worked up by customary methods. In general, a procedure is followed in which, after removing excess hydrocyanic acid and any volatile amines or ammonia present, the reaction mixture is filtered and the solid product thereby obtained is appropriately washed and dried.

Carbonyl compounds are also employed as starting compounds in process (1). Possible carbonyl compounds here are all compounds with reactive carbonyl groups. These include, preferably, aldehydes, ketones and keto esters.

Aldehydes which can particularly preferably be used are formaldehyde, acetaldehyde, hydroxyacetaldehyde, isobutyraldehyde, chloral, hydroxyethylaldehyde, hydroxypivalaldehyde, acrolein, crotonaldehyde, glyoxal, methylglyoxal, furfurol, hydroxymethylfurfurol, glucose, salicylaldehyde and glyceraldehyde.

Furthermore, it is also possible to use, in particular, those compounds which release aldehydes, for example formaldehyde, under the reaction conditions. These compounds include, preferably, chloral hydrate and hemi-acetals of formaldehyde, for example those which are derived from ethylene glycol, diethylene glycol, glycerol, methanol, ethanol and propanol.

Moreover, it is also possible to use, in particular, those aldehydes or aldehyde derivatives which are produced in situ from formaldehyde under the conditions of the synthesis of formose sugar mixtures. In this case, a procedure is followed in which modified azulmic acids which are charged with calcium hydroxide, lead hydroxide or other suitable catalysts or which contain catalytically active substances bonded as complexes, are allowed to act on formaldehyde. In this procedure, formaldehyde is converted, in a rapid reaction into $C_2$—, $C_3$—, $C_4$—, $C_5$— and $C_6$— aldehydes, such as hydroxyacetaldehyde, glyceraldehyde and aldehydes, containing hydroxyl groups, of higher functionality, which undergo stabilising condensation reactions in situ with amino groups of the azulmic acids.

Dihydroxyacetone and cyclohexanone may be mentioned in particular as ketones which can preferably be used, and ethyl acetoacetate may be mentioned as an example of a keto ester which can preferably be used.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (1). These additives include, preferably, all those materials which have already been mentioned as preferred in connection with the description of the additives optionally present in the substances to be used according to the invention.

Process (1) is carried out in an aqueous medium or in an aqueous-alcoholic medium. A preferred possible reaction medium is water, or a mixture of water and an alcohol, such as methanol or ethanol.

The condensation reaction in process (1) is carried out under acid, neutral or basic conditions.

The reaction temperatures can be varied within a substantial range in the case of process (1). In general, the reaction is carried out at temperatures between 10° C. and 250° C., preferably between 50° C. and 150° C.

In general, the reaction in process (1) is carried out under normal pressure. However, it is also possible to carry out the reaction under increased pressure.

In carrying out process (1), 0.05 to 6 moles, preferably 0.2 to 3 moles, of carbonyl compound, a catalytic amount, or even a larger amount, of acid or base (about 1 mole of acid or base per 100 parts by weight of azulmic acid) and optionally an amount of additives such that their proportion in the end product is between 1 and 95 percent by weight are employed per mole (relative to the molecular unit

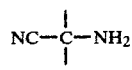

with the equivalent weight 54) of modified azulmic acid optionally containing additives. The mixture is worked up by customary methods. In general, a procedure is followed in which, after the reaction has ended, the reaction mixture is filtered and the solid product obtained is appropriately washed and dried.

In this connection it should be pointed out that even very small amounts of carbonyl compounds (0.05 to 0.2 mol) are frequently sufficient to obtain substances which have a high stability towards the splitting off of hydrogen cyanide under the influence of heat and under hydrolysis conditions.

If carbonyl compounds such as crotonaldehyde, cyclohexanone or ethyl acetoacetate are used for the condensation reaction, as a result of the fairly large cross-section of the molecules of these agents, the rate of conversion which can be achieved with these topochemical reactions is slower than when compounds with molecules of smaller cross-section are used. In these cases, relatively long reaction times (more than 30 hours) and relatively high reaction temperatures are therefore necessary to achieve adequate stabilising.

In process (2), acid addition salts or complex compounds, optionally containing additives, of modified azulmic acids containing from 0.5 to 55 percent by weight of ionic groups of the formula

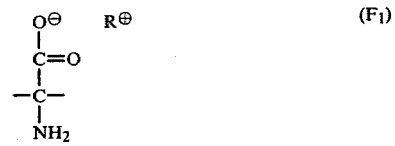

and containing from 0.5 to 15 percent by weight of groups of the formula

are subjected to a condensation reaction with carbonyl compounds in an aqueous medium, optionally in the presence of additives.

In the formula ($F_1$) R preferably represents those substituents which have already been mentioned as preferred for R in the description of the substances according to the invention.

The acid addition salts or complex compounds of modified azulmic acids (=azulmic acids containing structural defects) to be used as starting materials in process (2) can contain 1 to 95 percent by weight, preferably 5 to 90 percent by weight, of additives. Possible additives here are naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in the description of the additives optionally present in the substances to be used according to the invention.

Preferred possible acids which the acid addition salts, required as starting materials, of modified azulmic acids can contain, are all those acids which have already been mentioned in the description of the substances to be used according to the invention. Nitric acid, phosphoric acid, phosphorous acid, chloroacetic acid, dichloroacetic acid, trichloroacetic acid and hydrofluoric acid may be mentioned in particular.

Preferred salts which the complex compounds, required as starting materials, of modified azulmic acids can contain bonded as complexes are all those ammonium salts and metal compounds which have already been mentioned as preferred in the description of the substances to be used according to the invention. Iron-(II) acetate, iron(II) sulphate, iron(III) sulphate, copper acetate, zinc acetate, manganese(II) acetate, cobalt chloride, zinc chloride and tin(II) chloride may be mentioned in particular.

The acid addition salts, which can be used as starting materials, of modified azulmic acids are not yet known. However, they can be prepared by a process in which the modified azulmic acids, optionally containing additives, accessible by processes (A) or (B) are stirred with the particular acid in an aqueous medium at room temperature or at elevated temperatures. The reaction products are isolated by filtration. The preparation of some acid addition salts of modified azulmic acids has already been disclosed generally in the description of the preparation of modified azulmic acids.

The complex compounds, which can also be used as starting materials in process (2), of modified azulmic acids are not yet known. However, they can be prepared by a process in which the modified azulmic acids, optionally containing additives, accessible by processes (A) or (B) are stirred with the appropriate salts in an aqueous medium at temperatures between 20° C. and 120° C., preferably at 50° C. to 110° C. The mixture is worked up by customary methods. In general, the reaction products are isolated by filtration. The preparation of some complex compounds of modified azulmic acids has already been disclosed generally in the description of the preparation of modified azulmic acids.

Possible carbonyl compounds in carrying out process (2) are all the customary compounds with reactive carbonyl groups. These include, preferably, aldehydes, ketones and keto esters. All those aldehydes, substances which release an aldehyde, ketones and keto esters which have already been mentioned in particular in the description of process (1) are particularly preferred.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (2). These additives include, preferably, all those materials which have already been mentioned as preferred in the description of the additives optionally present in the substances to be used according to the invention.

Process (2) is carried out in an aqueous medium or in an aqueous-alcoholic medium. A preferred possible reaction medium is water, or a mixture of water and an alcohol, such as methanol or ethanol.

The condensation reaction in process (2) is carried out under acid, neutral or basic conditions.

The reaction temperatures can be varied within a substantial range in the case of process (2). In general, the reaction is carried out at temperatures between 10° C. and 250° C., preferably between 50° C. and 150° C.

In general, the reaction in process (2) is carried out under normal pressure. However, it is also possible to carry out the reaction under increased pressure.

In carrying out process (2), 0.05 to 6 moles, preferably 0.2 to 3 moles, of carbonyl compounds, a catalytic amount, or even a larger amount, of acid or base (about 1 mole of acid or base per 100 parts by weight of azulmic acid) and optionally an amount of additives such that their proportion in the end product is between 1 and 95 percent by weight, preferably between 5 and 90 percent by weight, are employed per mole (relative to the molecular unit

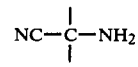

with the equivalent weight 54) of acid addition salts or complex compounds, optionally containing additives, of modified azulmic acid. The mixture is worked up by customary methods. In general, a procedure is followed in which, after the reaction has ended, the reaction mixture is filtered and the solid product obtained is appropriately washed and dried.

A small amount of carbonyl compounds (0.05 to 0.2 mol) is also frequently sufficient in carrying out process (2) to obtain substances which have a high stability towards the splitting off of hydrogen cyanide under the influence of heat and under hydrolysis conditions.

According to process (3), azulmic acids which are almost free from structural defects are subjected to a condensation reaction with carbonyl compounds in an aqueous medium, optionally in the presence of additives.

The azulmic acids which are almost free from structural defects and are required as starting materials are known (see Houben-Weyl, volume 8 (1952), page 261; German Pat. No. 662,338 and German Pat. No. 949,600).

Possible carbonyl compounds for carrying out process (3) are again all the customary compounds with reactive carbonyl groups. These include, preferably, aldehydes, ketones and keto esters. All those aldehydes, substances which release an aldehyde, ketones and keto esters which have already been mentioned in particular in the description of process (1) are particularly preferred.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (3). These additives include, preferably, all those materials which have already been mentioned as preferred in connection with the description of the additives optionally present in the substances to be used according to the invention.

Process (3) is carried out in an aqueous medium or in an aqueous-alcoholic medium. A preferred possible reaction medium is water, or a mixture of water and an alcohol, such as methanol or ethanol.

The condensation reaction in process (3) is carried out under acid, neutral or basic conditions.

The reaction temperatures can be varied within a substantial range in the case of process (3). In general, the reaction is carried out at temperatures between 10° C. and 250° C., preferably between 50° C. and 150° C.

In general, the reaction in process (3) is carried out under normal pressure. However, it is also possible to carry out the reaction under increased pressure.

In carrying out process (3), 0.05 to 6 moles, preferably 0.2 to 3 moles, of carbonyl compound, optionally a catalytic amount, or even a larger amount, of acid or base and optionally an amount of additives such that their proportion in the end product is between 1 and 95 percent by weight, preferably between 5 and 90 percent by weight, are employed per mole (relative to the molecular unit

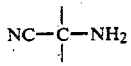

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

A small amount of carbonyl compounds (0.05 to 0.2 mol) is also frequently sufficient in carrying out process (3) to obtain substances which have a high stability towards the splitting off of hydrogen cyanide under the influence of heat and under hydrolysis conditions.

In process (4), hydrocyanic acid is polymerised under hydrolysing conditions in an aqueous medium with the aid of basic catalysts, optionally in the presence of additives, and the reaction products are then subjected to a condensation reaction with carbonyl compounds, without prior isolation, in an aqueous medium, optionally in the presence of additives.

Dilute aqueous hydrocyanic acid solutions, to which additives are optionally admixed, are used as starting materials in this procedure. In general, solutions with a hydrocyanic acid concentration of between 10 and 30%, preferably between 15 and 25%, are used.

Possible basic catalysts for process (4) are organic and inorganic bases and basic salts of the most diverse nature. All those bases or salts which have already been mentioned as preferred in connection with the description of process (B) can preferably be used here. Mixtures of the most diverse bases or basic salts can also advantageously be employed; a mixture of sodium cyanate and aqueous ammonia solution may be mentioned in particular.

Possible additives which can be added to the reaction mixture before and/or after the hydrocyanic acid polymerisation are again naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of the additives optionally present in the substances to be used according to the invention.

Possible carbonyl compounds which, in the case of process (4), are added to the reaction mixture after the hydrocyanic acid polymerisation are again all the customary compounds with reactive carbonyl groups. These include, preferably, aldehydes, ketones and keto esters. All those aldehydes, substances which release an aldehyde, ketones and keto esters which have already been mentioned in particular in the description of process (1) are particularly preferred.

Process (4) is carried out in an aqueous medium, preferably in water. However, it is also possible to replace some of the water by other diluents, such as hydrogen sulphide or alcohols, methanol and ethanol being mentioned in particular.

The reaction temperatures can be varied within a particular range in the case of process (4), it being necessary, however, for the temperature setting to be adjusted according to the particular reaction phase. In general, the procedure is to first carry out the polymerisation at temperatures between 30° C. and 70° C., preferably between 40° C. and 60° C., for 1 to 4 hours, so that an approximately 60% conversion of the monomeric hydrocyanic acid is achieved. Thereafter, polymerisation is carried out at temperatures between 70° and 95° C., preferably between 80° C. and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present. Thereafter, the condensation reaction with carbonyl compounds is carried out at the temperatures customary for this reaction. In general, the reaction is carried out at temperatures between 10° C. and 250° C., preferably between 50° C. and 150° C.

In general, the reaction in process (4) is carried out under normal pressure. However, it is also possible to carry out the reaction under increased pressure at temperatures between 120° C. and 150° C. In this procedure, relatively large amounts of structural defects can be produced in the process products in a controlled manner.

In carrying out process (4), the basic catalyst is employed in an amount such that its proportion is 1 to 15%, preferably 2 to 10%, of the monomeric hydrocyanic acid employed. The amount of carbonyl compounds is chosen so that 0.05 to 6 moles, preferably 0.2 to 3 moles, of carbonyl compound are present per mole (relative to the molecular unit

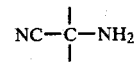

with the equivalent weight 54) of azulmic acid formed. The additives are optionally added to the reaction mixture in an amount such that their proportion in the end product is between 1 and 95 percent by weight, preferably between 5 and 90 percent by weight. The mixture is worked up by customary methods. In general, a procedure is followed in which, after removing excess hydrocyanic acid and any volatile amines of ammonia present, the reaction mixture is filtered and the solid product thereby obtained is appropriately washed and dried.

In process (5), modified azulmic acids are first reacted with bases in an aqueous medium and the products are then optionally treated with metal salts and subsequently subjected to a condensation reaction with carbonyl compounds, optionally in the presence of additives.

Possible modified azulmic acids here are all those azulmic acids which contain structural defects and which can also be employed as starting materials in carrying out process (1).

Possible bases or basic salts in carrying out process (5) are the most diverse inorganic or organic bases and basic salts. Alkali metal hydroxides, such as lithium hydroxide, sodium hydroxide and potassium hydroxide, alkali metal carbonates, such as sodium carbonate, potassium carbonate and potassium bicarbonate, alkali metal sulphides, such as sodium sulphide, potassium sulphide and potassium bisulphide, alkali metal thiosulphates, such as sodium thiosulphate, alkylamines and furthermore ammonium hydroxide and ammonium salts, such as ammonium polysulphides, can preferably be used.

Preferred possible metal salts in carrying out process (5) are all those metal salts which have already been mentioned as preferred in connection with the description of variant (e) of process (A). Iron(II) acetate, iron(II) sulphate, iron(III) sulphate, copper acetate, zinc acetate, manganese(II) acetate, cobalt chloride, zinc chloride and tin(II) chloride may be mentioned in particular.

Possible additives are again naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in the description of the additives optionally present in the substances to be used according to the invention.

Possible carbonyl compounds in the case of process (5) are again all the customary compounds with reactive carbonyl groups. These include, preferably, aldehydes, ketones and keto esters. All those aldehydes, substances which release an aldehyde, ketones and keto esters which have already been mentioned in particular in the description of process (1) are particularly preferred.

Process (5) is carried out in an aqueous medium, preferably in water. However, it is also possible to replace some of the water by other diluents, such as hydrogen sulphide or alcohols, methanol and ethanol being mentioned in particular.

The reaction temperatures can be varied within a substantial range in the case of process (5). In general, the reaction is first carried out at between 50° C. and 120° C., preferably between 60° C. and 110° C. Thereafter, the condensation reaction with carbonyl compounds is carried out at the temperatures customary for this reaction. In general, the reaction is carried out at temperatures between 10° C. and 250° C., preferably between 50° C. and 150° C.

In general, the reaction in process (5) is carried out under normal pressure. However, it is also possible to carry out the reaction under increased pressure. The latter is advisable, in particular, if ammonium hydroxide or volatile amines are employed as the bases.

In carrying out process (5), 0.5 to 4 moles of base or basic salt, optionally 1 to 2 moles of metal salt, 0.05 to 6 moles, preferably 0.2 to 3 moles, of carbonyl compound and optionally an amount of additives such that their proportion in the end product is between 1 and 95 percent by weight, preferably between 5 and 90 percent by weight, are preferably employed per mole (relative to the molecular unit

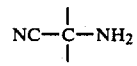

with the equivalent weight 54) of modified azulmic acid. The mixture is worked up by customary methods. In general, a procedure is followed in which, after the reaction has ended, the reaction mixture is filtered and the solid product obtained is appropriately washed and dried. However, a procedure is also possible in which the resulting dispersion is first concentrated, an alcohol, such as methanol, is then added, the mixture is again concentrated under reduced pressure and, after repeating this operation several times, the solid product thereby obtained is filtered off, washed and appropriately dried.

In process (6), modified azulmic acids are first treated with organic or inorganic acids in an aqueous medium and the products are then subjected to a condensation reaction with carbonyl compounds, optionally in the presence of additives.

Possible modified azulmic acids here are all those azulmic acids which contain structural defects and which can also be employed as starting materials in carrying out process (1).

Preferred possible inorganic or organic acids are all those acids which have already been listed as preferred in the description of the products to be used according to the invention.

Possible carbonyl compounds in carrying out process (6) are again all the customary compounds with reactive carbonyl groups. These include, preferably, aldehydes, ketones and keto esters. All those aldehydes, substances which release an aldehyde, ketones and keto esters which have already been mentioned in particular in the description of process (1) are particularly preferred.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (6). These additives include, preferably, all those materials which have already been mentioned as preferred in the description of the additives optionally present in the substances to be used according to the invention.

Process (6) is carried out in an aqueous medium, preferably in water. However, it is also possible to replace some of the water by other diluents, such as alcohols, methanol and ethanol being mentioned in particular.

The reaction temperatures can be varied within a substantial range in the case of process (6). In general, the treatment of the azulmic acids with acids is carried out at temperatures between 0° C. and 200° C., preferably between 20° C. and 120° C. Thereafter, the condensation reaction with carbonyl compounds is carried out at the temperatures customary for this reaction. In general, the reaction is carried out at temperatures between 10° C. and 250° C., preferably between 50° C. and 150° C.

In general, the reaction in process (6) is carried out under normal pressure. However, it is also possible to carry out the reaction under increased pressure.

In carrying out process (6), a catalytic amount, or even a larger amount—preferably 1 to 4 moles—of inorganic or organic acid, 0.05 to 6 moles, preferably 0.2 to 3 moles, of carbonyl compound and optionally an amount of additives such that their proportion in the end product is between 1 and 95 percent by weight, preferably between 5 and 90 percent by weight, are employed per mole (relative to the molecular unit

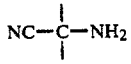

with the equivalent weight 54) of modified azulmic acid. The mixture is worked up by customary methods. In general, a procedure is followed in which, after the reaction has ended, the reaction mixture is filtered and the solid product obtained is appropriately washed and dried. Any excess acid still present in the products thus formed can be converted into the corresponding ammonium salts by gassing with ammonia, the reaction advantageously being carried out in the solid phase in a fluidised bed.

In process (7), azulmic acids which are almost free from structural defects are subjected to a condensation reaction with carbonyl compounds in an aqueous medium, in the presence of hydrolytically degradable naturally occurring substances and in the presence of an acid.

Possible hydrolytically degradable naturally occurring substances here are all those naturally occurring substances which are completely or partially degraded under the influence of an acid. These include, preferably, celluloses, hemicelluloses, sugars, lignin, polymeric quinones, wood flour, vegetable material, polypeptides, such as gelatin and wool, and furthermore yeast proteins, algal compositions and peat compositions.

Possible acids are all the sufficiently strong organic or inorganic acids. Phosphoric acid and phosphorous acid can be preferably used.

Possible carbonyl compounds in carrying out process (7) are again all the customary compounds with reactive carbonyl groups. These include, preferably, aldehydes, ketones and keto esters. All those aldehydes, substances which release an aldehyde, ketones and keto esters which have already been mentioned in particular in the description of process (1) are particularly preferred.

Process (7) is carried out in an aqueous medium, preferably in water. However, it is also possible to replace some of the water by other diluents, such as alcohols, methanol and ethanol being mentioned in particular.

The reaction temperatures can be varied within a substantial range in carrying out process (7). In general, the reaction is carried out at temperatures between 10° C. and 250° C., preferably between 50° C. and 150° C.

In general, the reaction in process (7) is carried out under normal pressure. However, it is also possible to carry out the reaction under increased pressure.

In carrying out process (7), a catalytic amount, or even a larger amount—preferably 1 to 4 moles—of inorganic or organic acid, 0.05 to 6 moles, preferably 0.2 to 3 moles, of carbonyl compound and an amount of hydrolytically degradable naturally occurring substances such that their proportion in the end product is between 1 and 95 percent by weight, preferably between 5 and 90 percent by weight, are preferably employed per mole (relative to the molecular unit

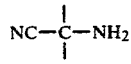

with the equivalent weight 54) of azulmic acid. In this procedure, structural defects are produced with simultaneous hydrolytic degradation of the particular naturally occurring substances employed and with simultaneous stabilising of the azulmic acids by condensation with carbonyl compounds. If 0.2 to 80% strength phosphoric acid or phosphorous acid and polypeptides are used, the latter are split into aminoacid mixtures.

Because of its numerous amino groups, the azulmic acid bonds about 0.3 to 0.4 mol of acid, for example phosphoric acid or phosphorous acid, whilst the phosphoric acid salts of the aminoacids or those of the oligopolypeptides, or the other low-molecular degradation products of the naturally occurring substances employed are frequently fixed by the azulmic acid matrix in a large amount, even when they are water-soluble. Excess acid, for example phosphoric acid, can be precipitated on the azulmic acid matrix as calcium phosphate by adding calcium hydroxide. If hydrolysed sugars and oligosaccharides are present in this case, they are absorbed onto the azulmic acid in the form of their calcium complexes, which are usually sparingly soluble. The process products obtained by this process can be stored for a relatively long period without unpleasant odours being formed, as is otherwise the case when naturally occurring substances such as oligopeptides, peptide/sugar mixtures and the like are degraded by biological processes. Substances of this type are outstandingly suitable for the fertilisation of plants.

Isolation of the process products if carried out by customary methods, in general by filtration.

If free amino groups are still present in the products prepared by processes (1) to (7), these products can be converted into the corresponding acid-addition salts by treatment with inorganic or organic acids. In this case, a procedure is followed in which the products are stirred with the particular acid in an aqueous medium, optionally at elevated temperature. The reaction products are isolated by filtration.

If free carboxyl groups are still present in the products prepared by processes (1) to (7), these products can be converted into the corresponding salts by treatment with bases. In this case, a procedure is followed in which the products are stirred with the particular base in an aqueous medium, optionally at elevated temperature. The reaction products are isolated by filtration.

Furthermore, products according to the invention can also be converted into complex compounds. In this case, a procedure is followed in which the products are stirred with a metal salt in an aqueous medium, optionally at elevated temperature. The reaction products are isolated by filtration. They are very suitable for the fertilisation of plants.

The processes can be carried out according to a number of specific variants. Thus, a preferred embodiment of process (2) consists of a procedure in which structural defects are produced in azulmic acid which is almost free from structural defects using nitric acid according to variant (a) of process (A), the reaction temperature being kept relatively low, preferably between 20° C. and 30° C., during this procedure, and the modified azulmic acids thereby formed in a topochemical reaction, in which 30 to 50% of the amino groups present are in the form of ionic groups of the formula

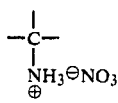

are subjected to a condensation reaction with carbonyl compounds, if appropriate after prior gassing with ammonia, in an aqueous medium. The gassing with ammonia, in which traces of free nitric acid are converted into ammonium nitrate, is appropriately carried out in the solid phase in a fluidised bed. The products formed in this procedure are valuable fertilisers, because both the organically bonded nitrogen of the azulmic acids and the inorganically bonded nitrogen of the ammonium salts are available to plants.

A further preferred embodiment of process (2) consists of a procedure in which structural defects are produced in azulmic acid which is almost free from structural defects using phosphoric acid or phosphorous acid according to variant (a) of process (A), the reaction temperature being kept relatively low, preferably between 20° C. and 55° C., during this procedure, and the modified azulmic acids thereby formed in a topochemical reaction, which have only a few $F_2$ structural defects and which contain phosphoric acid or phosphorous acid bonded in the form of salt, are subjected to a condensation reaction with carbonyl compounds, if appropriate after prior gassing with ammonia. The gassing with ammonia is again appropriately carried out in the solid phase in a fluidised bed. In this case also, very active fertilisers are obtained.

A preferred embodiment of process (1) consists of a procedure in which structural defects are produced in azulmic acid which is almost free from structural defects using 1 to 4 mols of 1 molar phosphoric acid, the excess phosphoric acid is then precipitated as calcium phosphate by adding calcium chloride, as magnesium phosphate by adding magnesium chloride or as ammonium magnesium phosphate by adding ammonia and magnesium salts, and thereafter the reaction product is subjected to a condensation reaction with carbonyl compounds, optionally in the presence of additives. Particularly preferred additives in this case are vegetable ashes, insoluble polyquinones, addition products and condensation products of benzoquinone with amines, in particular with ammonia, and furthermore lignin-sulphonic acids, humic acids, various fly ashes, bauxite, aluminium oxide, cobalt molybdate, silicon dioxide, active charcoal, zirconium dioxide, nickel oxide, palladium oxide and barium oxide. Further preferred additives are sugars, such as cane sugar, and other sugars which contain no free aldehyde groups, or formose sugar mixtures prepared from formaldehyde. These most diverse types of sugars can be fixed in the channels and pores of the solid azulmic acid matrices. Moreover, the various sugars can also be absorbed onto the azulmic acids in the form of their calcium complexes, which are usually sparingly soluble.

A further embodiment of process (1) consists of a procedure in which structural defects are produced in azulmic acids which are almost free from structural defects with the aid of strong bases, for example potassium hydroxide, according to variant (b) of process (A), relatively long reaction times being observed, and the modified azulmic acids thereby formed in a topochemical reaction, which have polyelectrolyte character, are subjected to a condensation reaction with carbonyl compounds, optionally in the presence of additives.

Another preferred embodiment of process (1) consists of a procedure in which structural defects are produced in azulmic acids which are almost free from structural defects using gaseous ammonia under pressure in an aqueous-alcoholic medium at temperatures between 120° C. and 140° C., according to variant (b) of process (A), and the modified azulmic acids thereby formed in a topochemical reaction, which have a high content of ammonium carboxylate groups, are subjected to a condensation reaction with carbonyl compounds, optionally in the presence of additives.

Another preferred embodiment of process (1) consists of a procedure in which structural defects are produced in azulmic acids which are almost free from structural defects using waterglass according to variant (b) of process (A) and the modified azulmic acids, charged with potassium ions or sodium ions, thereby formed in a topochemical reaction, the saponifiable nitrile groups of which act as latent acids and precipitate silicic acids, are subjected to a condensation reaction with carbonyl compounds, optionally in the presence of additives. The silicic acids which have precipitated are absorbed, in fine distribution, onto the reaction products. Any excess sodium silicate or potassium silicate present can be precipitated by simple gassing of the particular dispersions with carbon dioxide, or can be precipitated in a particularly advantageous manner by adding phosphoric acid or calcium chloride mixed with potassium phosphates or sodium phosphates or calcium silicates.

Yet another preferred embodiment of process (1) consists of a procedure in which structural defects are produced in azulmic acids which are almost free from structural defects using 25% strength aqueous ammonia solution at room temperature in the course of 6 to 20 hours, according to variant (b) of process (A), and the modified azulmic acids, containing ammonium salts, thereby formed in a topochemical reaction are subjected to a condensation reaction with carbonyl compounds, optionally in the presence of additives.

It is frequently also appropriate to treat moist azulmic acids stabilised with carbonyl compounds and optionally containing additives with ammonia gas, with simultaneous gassing with carbon dioxide, structural defects being produced. Ammonia and carbon dioxide thereby penetrate into the azulmic acid matrix to a considerable extent as small molecules. In the case of gassing with ammonia in a fluidised bed, for example, the unstable ammonium carbaminates, ammonium bicarbonates and, if ammonia and carbon dioxide are introduced in the absence of water, ammonium carbamate of the formula

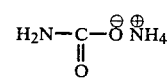

are obtained, fixed in the channels of the azulmic acid. In this form, the ammonium carbamate has a reduced liability to decompose at room temperature. It provides a nitrogen fertiliser for plants.

A further important embodiment of process (2) consists of a procedure in which azulmic acid complexed with calcium hydroxide is reacted with sucrose, sugars, glucose or formose formulations which are prepared by condensation of formaldehyde with calcium hydroxide. If, for example, sucrose is used in this procedure, azulmic acids are formed which are charged with sucrose-calcium oxide complexes of the composition 3 $CaO \cdot C_{12}H_{22}O_{11}$.

If modified azulmic acids are employed as starting materials in the processes described, it is not absolutely necessary to isolate them after their preparation. Rather, it is by all means possible first to synthesise the modified azulmic acids and then directly to subject these to a condensation reaction with carbonyl compounds, without prior isolation.

In the case of the processes described, it is possible to carry out the production of structural defects and the simultaneous or subsequent condensation with carbonyl compounds not only in water but also in those hydrolysing media in which some of the water has been replaced by hydrogen sulphide, or in which the water contains sodium sulphides, ammonium polysulphides or potassium bisulphide. If in such cases the process is carried out at temperatures between 70° C. and 100° C., small amounts of hydrocyanic acid split off are converted into carbon oxysulphide and ammonia, structural defects being produced at the same time.

The number of structural defects in the products according to the invention can optionally be increased by those methods which have already been described in connection with the preparation of modified azulmic acids.

It is frequently advantageous to treat the products with bases after their preparation, in order, for example, to convert metal salts contained therein into metal hydroxides or oxides, or, for example, to allow aldehydes still contained therein to react completely. For this purpose, the products are preferably treated or gassed with ammonia or primary or secondary amines, or reacted with hydrazine hydrate, aqueous cyanamide solutions or aqueous ammonia solution. In the case of the action of ammonia, small amounts of formaldehyde still contained in the products condensed with formaldehyde, for example, are converted into hexamethylenetetramine or hexahydrotriazines. An after-treatment with 25% strength aqueous ammonia solution is frequently advisable.

As already mentioned, even a relatively small amount of carbonyl compound is frequently sufficient to obtain products which are relatively stable towards the splitting off of hydrocyanic acid, both under the influence of heat and under hydrolysis conditions. If formaldehyde is used for the stabilising, hydrocyanic acid thereby split off can be trapped particularly readily by the formation of water-soluble cyanohydrins from hydrocyanic acid and formaldehyde.

If a sufficient amount of carbonyl compounds is used for the stabilising in the reactions described, products are formed from which hydrogen cyanide is split off neither in the dry state nor in the moist state at room temperature or even at higher temperatures. This is shown, inter alia, by the fact that in contrast to azulmic acids which have not been stabilised, the products to be used according to the invention are completely inert to standardised dried yeast formulations and in no way reduce the activity of the yeast during the alcoholic fermentation of cane sugar under mild conditions. Thus, the fermentation of cane sugar with standardised dry air in buffered aqueous solution at 35° C. is not impaired by azulmic acid, condensed with formaldehyde, simultaneously present, whilst a considerably retarded conversion of cane sugar is found when the same test is carried out in the presence of azulmic acids which have not been stabilised. Thus, in the last case, the yeast enzymes are so severely deactivated by the cyanide ions contained in the reaction mixture that the alcoholic fermentation is drastically inhibited.

The azulmic acids stabilised by condensation with carbonyl compounds and containing structural defects, and acid addition salts and complex compounds thereof and mixed products thereof with additives are suitable as agrochemical agents (=agrochemicals). By these there are to be understood agents which can be used for the most diverse purposes in agriculture and horticulture.

Thus, the substances according to the invention are suitable, for example, as fertilisers both for supplying plants with micronutrients and for supplying plants with macronutrients; they are particularly suitable as fertilisers having a long-term action. Those substances according to the invention which contain ions required by plants, such as ammonium ions, lithium ions, sodium ions, potassium ions, beryllium ions, magnesium ions, calcium ions, strontium ions, barium ions, aluminium ions, zinc ions, manganese ions, nickel ions, cobalt ions or iron ions, are of particular interest in this context.

Those substances according to the invention which contain anions such as chloride, nitrate, sulphate and/or phosphate are also of particular interest as fertilisers.

Particularly preferred fertilisers are those substances according to the invention which contain several of the above-mentioned types of ions side by side. Examples which may be mentioned are substances which contain both potassium and/or ammonium ions and nitrate and/or phosphate ions.

Furthermore, those substances according to the invention which also contain organic substances, optionally in addition to nutrient ions, are of particular interest as fertilisers. Substances which may be mentioned in particular in this context are wood flour, lignin powder, lignin-sulphonic acids, ammonified lignin-sulphonic acids, humus, humic acids, ammonified humic acids, peat, proteins and degradation products, for example hydrolysis products, of yeast, algae material (alginates), polypeptides, such as wool and gelatine, fish-meal and bone-meal, and furthermore amino acids, oligopolypeptides, pectins, monosaccharides, such as glucose and fructose, disaccharides, such as sucrose, oligosaccharides, polysaccharides, such as starch and cellulose, and also hemicelluloses, homogenised materials of vegetable and animal origin, active charcoals and ashes which are obtainable by partial oxidation, complete oxidation or combustion of organic substances formed by photosynthesis or of customary fuels, wherein fir ash, broom ash, ash of Serbian spruce, oak ash, birch ash, beech ash, willow ash and tobacco leaf ash, may be mentioned.

Those substances to be used according to the invention which also contain commercially available fertilisers, optionally in addition to nutrient ions, are additionally preferably to be used as fertilisers. Commercially available fertilisers of this type which may be mentioned in this connection are super phosphate, basic slag, Rhenania phosphate, phosphorite, calcium cyanamide, calcium ammonium nitrate, Leuna saltpeter, potassium phosphates, potassium nitrate and ammonium nitrate, and furthermore urea/formaldehyde condensation products, urea/crotonaldehyde condensation products, urea/isobutyraldehyde condensation products and condensation products of dicyandiamide, melamine or oxamide and aldehydes, such as formaldehyde, acetaldehyde, crotonaldehyde or isobutyraldehyde.

Those substances according to the invention which also contain biologically active garden mould, optionally in addition to nutrients, can also preferably be used as fertilisers.

Furthermore, the substances according to the invention are suitable as agents for improving soil. Those substances according to the invention which contain wood powder or vegetable material can preferably be used for this purpose. Azulmic acids which can also preferably be used as agents for improving soil are those which have first been partially (inly about every fourth amino group, in statistical distribution) condensed with carbonyl compounds, in particular formaldehyde, and then are reacted with formaldehyde in the presence of calcium hydroxide. Under these conditions, glycolaldehyde ($C_2$-aldehyde), glyceraldehyde ($C_3$-aldehyde) and further $C_4$-$C_7$-hydroxyaldehydes are formed very rapidly in situ from monomeric formaldehyde, and can undergo condensation reactions with remaining amino groups on the azulmic acids and can likewise lead to partial stabilising of the substances according to the invention. Because of the tackiness of the concomitant higher-molcular caramellised sugars obtained, these products can be spray-dried completely free from formaldehyde. They are brown-black, humus-like substances with a friable structure, which are of interest both as agents for improving soil and as plant nutrients. The sugar mixtures absorbed onto the matrix in this procedure can be complexed with relatively large amounts of calcium hydroxide or mgnesium hydroxide, sugar complexes being formed such as are known, for example, with sucrose, 3 moles of calcium oxide being bonded per mole of sucrose. In the case of the substances containing azulmic acid, formose and calcium hydroxide, the low solubility of complexes of this type advantageously impedes rapid washing out of the sugars when the substances are applied in the agricultural sector.

Those substances to be used according to the invention which have a high content of structural defects have a polyelectrolyte character, and in the soil can function as fertilisers with ion exchanger properties. In this case, the ions required by plants, for example potassium ions and/or ammonium ions, are released into the earth or onto the substrate, whilst other ions are bonded.

As a result of the high absorbency and the good capacity for forming complexes, the substances according to the invention can also be used for fixing harmful substances in soil. Thus, with the aid of the substances according to the invention, it is possible, for example, to bond undesired heavy metal ions present in soil, for example ions of lead and of mercury, so firmly that damage to plants need no longer be feared. Furthermore, oil pollution, overdoses of agents for plant protection or excessively high salt concentrations in substrates can be removed by adding substances to be used according to the invention.

Substances according to the invention which also contain peat, in addition to other plant nutrients, can be used in a simple manner industrially, by adding binders, such as starch, degraded celluloses, alginates and Pectin substances, for the production of compressed peat pots for the horticultural business. In this case, it is appropriate for the proportion by volume of white peat to black peat in the substrate to be about 1:1.

Substances according to the invention which contain, in addition to other plant nutrients, about 20 to 40 percent by weight of peat are also very suitable for covering soils and substrates as well as seed rows, since the black colour of the substances to be used according to the invention ensures a good earth-like appearance, surface crusting is prevented and more rapid germination in seed rows is effected.

Substances to be used according to the invention which contain peat are also suitable for preventing or weakening odours arising during decomposition processes.

Substances to be used according to the invention which also contain peat, in addition to other plant nutrients, can be converted, by adding starch adhesives, hemicelluloses or alginates, into shaped, moisture-retaining materials which are impermeable to air and are suitable as packing materials for the transportation of plants.

Substances to be used according to the invention are also suitable for protecting plants or parts of plants from pests, such as, for example, caterpillars. For example, if a spray liquor based on a substance containing 4–12 percent by weight of structural defects of the formula

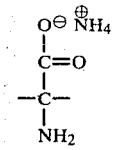

mixed with 10 percent by weight of caramellised formose per 100 percent by weight of product according to the invention is used for spraying the foliage of fruit trees, an adhesive, sticky layer is formed on the leaves which, on the one hand, reduces damage to the leaves by pests, for example caterpillars, and on the other hand, provides a top dressing.

The substances according to the invention can be employed as such, or in their formulations, for supplying plants with nutrients or as agents for improving soil.

The substances to be used according to the invention can be converted to the customary formulations, such as emulsions, wettable powders, suspensions, powders, dusting agents, foams, pastes, granules, suspension-emulsion concentrates, seed-treatment powders, natural and synthetic materials impregnated with active compound or very fine capsules in polymeric substances and in coating compositions, for use on seed.

These formulations may be produced in known manner, for example by mixing the active compounds with extenders, that is to say liquid and/or solid diluents, carriers, optionally with the use of surface-active agents, that is to say emulsifying agents and/or dispersing agents and/or foam-forming agents. In the case of the use of water as an extender, organic solvents can, for example, also be used as auxiliary solvents.

As liquid diluents or carriers, especially solvents, there are suitable in the main, aromatic hydrocarbons, such as xylene, toluene or alkyl naphthalenes, chlorinated aromatic or chlorinated aliphatic hydrocarbons, such as chlorobenzenes, chloroethylenes or methylene chloride, aliphatic or alicyclic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethylformamide and dimethylsulphoxide, as well as water.

As solid carriers there may be used ground natural minerals, such as kaolins, clays, talc, chalk, quartz, attapulgite, montmorillonite or diatomaceous earth, and ground synthetic minerals, such as highly-dispersed silicic acid, alumina and silicates. As solid carriers for granules there may be used crushed and fractionated natural rocks such as calcite, marble, pumice, sepiolite and dolomite, as well as synthetic granules of inorganic and organic meals, and granules of organic material such as sawdust, coconut shells, maize cobs and tobacco stalks.

As emulsifying and/or foam-forming agents there may be used non-ionic and anionic emulsifiers, such as polyoxyethylene-fatty acid esters, polyoxyethylene-fatty alcohol ethers, for example alkylaryl polyglycol ethers, alkyl sulphonates, alkyl sulphates, aryl sulphonates as well as albumin hydrolysis products. Dispersing agents include, for example, lignin sulphite waste liquors and methylcellulose.

Adhesives such as carboxymethylcellulose and natural and synthetic polymers in the form of powders, granules or latcies, such as gum arabic, polyvinyl alcohol and polyvinyl acetate, can be used in the formulations.

It is possible to use colorants jsuch as inorganic pigments, for example iron oxide, titanium oxide and Prussian Blue, and organic dyestuffs, such as alizarin dyestuffs, azo dyestuffs or metal phthalocyanine dyestuffs, and trace nutrients, such as salts or iron, manganese, boron, copper, cobalt, molybdenum and zinc.

The formulations in general contain from 0.1 to 95 percent by weight of active compound, preferably from 0.5 to 90 percent by weight.

The substances according to the invention can be in the formulations as mixtures with other fertilisers or pesticidal active compounds.

When used as fertilisers or as agents for improving soil, the active compounds can be applied either in the form of the substances themselves or in the form of their formulations or the use forms prepared therefrom, such as ready-to-use emulsions, foams, suspensions, powders, pastes and granules. They are applied in accordance with the methods customary in agriculture and in horticulture, for exaple by direct introduction into the soil, by watering, spraying, atomising, scattering, dusting and the like. The following may be mentioned as special types of application: root application, leaf application, stem injection and bark application. In the case of root application, the fertiliser can either be mixed with the culture substrate or be introduced into furrows in the soil. Furthermore, it is possible to introduce the fertiliser into the lower root region by means of a fertiliser lance or through punched or drilled holes. Application to the leaf is as a rule effected by spraying the plants with a fertiliser formulation or by dipping plants or parts of plants into a fertiliser formulation. In the case of stem injection, the fertiliser is directly introduced into the plants through bore-holes or tree trunks or branches. Bark application can be effected by spraying the bare wood with the fertiliser formulation, or by placing bands, for example of textile, paper or foam plastic, impregnated with nutrients, on tree trunks or branches—if appropriate after partial or complete removal of the layer of bark or cork in the treatment zone.

Application to the bark by means of pastes containing nutrients is also possible.

The amount of active substances employed can vary within a relatively wide range. When the substances are used as fertilisers or as agents for improving soil, the amount depends essentially on the nature of the soil and on the nutrient requirement of the particular plants. In general, the amounts of active compound applied are between 0.1 and 200 kg/ha, preferably between 1 and 100 kg/ha. If the substances according to the invention are used for other purposes, for example for covering substrates, for the production of packing materials for plants, for protecting plants or parts of plants, for the production of compressed peat pots or for bonding undesired odours, the amount of active compound employed is adjusted to suit the particular requirement.

The good activity of the substances according to the invention as fertilisers can be seen from the examples which follow.

PREPARATIONS LIST

Preparation (A)=azulmic acid stabilised with formaldehyde, in which about 78% of the amino groups contained therein were condensed. Composition: 35.3% C; 4.0% H; 39.1% N; 21.5% O.

Preparation (B)=azulmic acid, in which about 7% by weight of structural defects of the formula

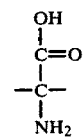

were first produced by saponification, and then about 13% by weight of phosphoric acid was fixed onto the matrix.

Composition: 33.3% C; 4.3% H; 28.1% N; 4.1% P; 3.2% K.

Preparation (C)=azulmic acid, in which structural defects of the formula

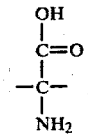

were first produced by acid saponification, and then about 12.5% by weight of phosphoric acid were fixed onto the matrix.

Composition: 36.1% C; 3.9% H; 32.1% N; 24.1% O; 3.9% P.

Preparation (D)=azulmic acid stabilised with formaldehyde

Preparation (E)=azulmic acid stabilised with formaldehyde

Preparation (F)=azulmic acid stabilised with formaldehyde

Preparation (G)=azulmic acid stabilised with formaldehyde

EXAMPLE A

Fertilisation test/test in the open

Test plant: grass (lawn)

Areas of lawn 1.5 m² were fertilised on the surface with the particular amount of preparation desired.

Evaluation was carried out after 6 weeks. The additional growth and the appearance of the area of grass were assessed in each case. The ratings had the following meanings:

1 = very heavy additional growth, dark green
2 = heavy additional growth, dark green
3 = average additional growth, green
4 = slight additional growth, light green
5 = control (without fertilisation)

The active compound preparations, amounts applied and test results can be seen from the table which follows:

TABLE A

| | | Fertilisation test/test in the open | | | | |
|---|---|---|---|---|---|---|
| | Nitrogen per m² | Amount of preparation in g per | | Ratings | | |
| Preparation | [g] | 1 m² | 1.5 m² | Repeat 1 | Repeat 2 | φ |
| A | 10 | 25.6 | 38.4 | 5 | 4 | 4.5 |
| | 25 | 64 | 96 | 4 | 3 | 3.5 |
| | 50 | 128 | 192 | 3 | 2-3 | 2.8 |
| | 100 | 256 | 384 | 1-2 | 1 | 1.3 |
| B | 10 | 31.2 | 46.8 | 4-5 | 4-5 | 4.5 |
| | 25 | 78 | 117 | 3-4 | 3-4 | 3.5 |
| | 50 | 156 | 234 | 2 | 2 | 2 |
| | 100 | 312 | 468 | 1 | 1-2 | 1.3 |
| C | 10 | 35.6 | 53.4 | 4 | 4-5 | 4.3 |
| | 25 | 89 | 133.5 | 3 | 4 | 3.5 |
| | 50 | 178 | 267 | 1-2 | 2 | 1.8 |
| | 100 | 356 | 534 | 2 | 2 | 2 |
| Control | — | — | — | 5 | 5 | 5 |

EXAMPLE B

Fertilisation test/test in the open

Test plant: potted chrysanthemums
Type of soil: sandy loam + 30% by volume of peat per 1.5 liter vessel A base fertiliser was first added to each pot, and in particular 0.25 g of phosphorus pentoxide in the form of superphosphate and 0.4 g of potassium oxide in the form of potassium magnesia were added per liter of soil.

The particular amount desired of the test preparaion was then placed on the surface of the soil.

Evaluation was carried out after 3 months. The additional growth and the appearance of the plants (leaves) were evaluated in each case. The ratings had the following meanings:

1 = dark green
2 = medium green
3 = light to medium green
4 = light green
5 = light green to yellow The active compound preparations, amounts applied and test results can be seen from the table which follows:

TABLE B

| | | | Fertilization test/test in the open | | | |
|---|---|---|---|---|---|---|
| | Nitrogen | Amount of preparation | | Leaf colour | | |
| Preparation | [g/l of soil] | preparation g/l of soil | per 1.5 l of soil | Growth height in cm | Rating | anthocyanin coloration | Leaf damage |
| A | 0.5 | 1.28 | 1.9 | 18 | 2 | + | slight |
| | 1 | 2.56 | 3.8 | 19 | 2 | + | " |
| | 2.5 | 6.39 | 9.6 | 20 | 1 | + | severe |
| | 5 | 12.78 | 19.2 | 20 | 1 | + | " |
| B | 0.5 | 1.56 | 2.3 | 19 | 3 | + | — |
| | 1 | 3.12 | 4.7 | 22 | 3 | + | slight |
| | 2.5 | 7.78 | 11.7 | 23 | 2-3 | + | severe |
| | 5 | 15.56 | 23.4 | 16 | 2 | + | very severe |
| C | 0.5 | 1.78 | 2.7 | 25 | 3 | + | — |
| | 1 | 3.56 | 5.3 | 26 | 2 | + | — |
| | 2.5 | 8.89 | 13.3 | 30 | 2 | + | — |
| | 5 | 17.80 | 26.7 | 27 | 1-2 | + | — |
| Control | — | — | — | 18 | 5 | + | — |

EXAMPLE C

Fertilisation test/test in the open

Test plant: "Berliner Tiergarten" grass, 3 g per vessel
Type of soil: sandy loam + 30% by volume of peat
Vessel: plastic pots of 10 liter capacity, filled with 8.5 kg of soil A base fertiliser was first added to each pot, and in particular 0.25 g of phosphorus pentoxide in the form of superphosphate and 0.40 g of potassium oxide in the form of potassium magnesia were added per liter of soil.

The particular amount desired of the test preparation was then placed on the surface of the soil.

Evaluation was carried out after 7 weeks and 11 weeks. The additional growth and the appearance of the plants were evaluated in each case. The ratings had the following meanings:

1 = dark green
2 = medium green
3 = medium green to yellow

The active compound preparations, amounts applied and test results can be seen from the table which follows.

TABLE C

| | | Fertilisation test/test in the open | | | | |
|---|---|---|---|---|---|---|
| Preparation | Nitrogen g per l of soil | Amount of preparation g per l of soil | 1st cut | Dry substance g/vessel 2nd cut | 1st + 2nd | Rating |
| A | 0.5 | 1.28 | 7.2 | 4.4 | 11.6 | 3 |
| | 1.0 | 2.56 | 10.3 | 6.6 | 16.9 | 3 |
| | 2.5 | 6.39 | 8.5 | 11.3 | 19.8 | 3 |
| | 5.0 | 12.78 | 3.9 | 7.2 | 11.1 | 2 |
| B | 0.5 | 1.56 | 10.4 | 5.1 | 15.6 | 3 |
| | 1.0 | 3.12 | 13.9 | 8.2 | 22.1 | 2 |
| | 2.5 | 7.76 | 23.2 | 9.9 | 33.1 | 1-2 |
| | 5.0 | 15.56 | — | — | — | — |
| C | 0.5 | 1.78 | 5.2 | 5.4 | 10.6 | 3 |
| | 1.0 | 3.56 | 6.4 | 3.9 | 10.3 | 3 |
| | 2.5 | 8.89 | 11.4 | 6.3 | 17.7 | 2 |
| Control | — | — | 4.2 | 2.8 | 7.0 | 3 |

EXAMPLE D

Fertilisation test/test in the open and in a greenhouse

Test plant: "Berliner Tiergarten" grass, 3 g per vessel
Type of soil: sandy loam/30% by volume of peat
Vessel: plastic pots of 10 liter capacity, filled with 8.5 kg of soil A base fertiliser was first added to each pot, and in particular 0.25 g of phosphorus pentoxide in the form of superphosphate and 0.40 g of potassium oxide in the form of potassium magnesia were added per liter of soil.

The particular amount desired of the test preparation was then placed on the surface of the soil.

Evaluation was carried out after 7 weeks, 11 weeks, 4 months, 5½ months, 8 months and 10½ months. The cut weights were determined in each case. The vessels stood in the open until after the second cut and then in a greenhouse.

The active compound preparations, amounts applied and test results can be seen from the table which follows.

TABLE D

Fertilisaton test/test in the open and in a greenhouse
Yield average amount, in g, of dry substance per vessel

| Preparation | g of N per l of soil | Individual cut weights | | | | | | Total cut weights | | | | | |
|---|---|---|---|---|---|---|---|---|---|---|---|---|---|
| | | 1st cut 17.9.74 | 2nd cut 16.10.74 | 3rd cut 23.11.74 | 4th cut 14.2.74 | 5th cut 1.4.75 | 6th cut 24.6.75 | 1st cut | 2nd cut | 3rd cut | 4th cut | 5th cut | 6th cut |
| (without fertiliser) | | 4.2 | 2.8 | 3.3 | 1.8 | 1.4 | 4.8 | 4.2 | 7.0 | 10.3 | 12.1 | 13.5 | 18.3 |
| A | 0.5 | 7.2 | 4.4 | 4.4 | 2.3 | 2.7 | 8.2 | 0.5 | 7.7 | 12.1 | 16.5 | 18.8 | 21.5 |
| | 1 | 10.3 | 6.6 | 6.0 | 4.1 | 5.9 | 10.8 | 10.3 | 16.9 | 22.9 | 27.0 | 32.9 | 43.7 |
| | 2.5 | 8.5 | 11.3 | 7.2 | 3.6 | 6.3 | 16.7 | 8.5 | 19.8 | 27.0 | 30.6 | 36.9 | 53.6 |
| B | 0.5 | 10.4 | 5.1 | 4.8 | 2.7 | 3.0 | 8.3 | 10.4 | 15.5 | 20.3 | 23.0 | 26.0 | 34.3 |
| | 1 | 13.9 | 8.2 | 5.6 | 3.6 | 4.0 | 9.0 | 13.9 | 22.1 | 27.7 | 31.3 | 35.3 | 44.3 |
| | 3.5 | 23.2 | 9.9 | 8.2 | 2.7 | 6.2 | 20.1 | 23.2 | 33.1 | 41.3 | 44.0 | 50.2 | 70.3 |
| C | 0.5 | 5.2 | 5.4 | 3.4 | 2.4 | 2.1 | 6.0 | 5.2 | 10.6 | 14.0 | 16.4 | 18.5 | 24.5 |
| | 1 | 6.4 | 3.9 | 4.5 | 2.9 | 3.2 | 6.7 | 6.4 | 10.3 | 14.8 | 17.7 | 20.9 | 27.6 |
| | 2.5 | 11.4 | 6.3 | 6.4 | 3.3 | 6.1 | 10.4 | 11.4 | 17.7 | 24.1 | 27.4 | 33.6 | 43.9 |

TABLE E

Fertilisation test/test in the open

| Preparation | g of N per l of soil | Average growth height in cm | Characteristic rating of the green coloration of the leaves |
|---|---|---|---|
| (without fertiliser) | — | 18 | 7 |
| A | 0.5 | 18 | 2 |
| | 1 | 19 | 2 |
| | 2.5 | 20 | 1 |
| B | 0.5 | 19 | 3 |
| | 1 | 22 | 2 |
| | 2.5 | 23 | 2 |
| C | 0.5 | 25 | 3 |
| | 1 | 26 | 2 |
| | 2.5 | 30 | 2 |

EXAMPLE F

Fertilisation test/test in a greenhouse

Test plants: Chrysanthemum indicum; Variety: Yellow Delaware
Type of soil: sandy loam soil
Vessel: flowerpots containing 900 g of soil
Soil moisture during growing: about 70% of the maximum capacity for water at 20° C.

The particular amount desired of the test preparation was placed on the soil surface. Evaluation was carried out at various intervals of time. The average weight of fresh substance and the growth height of the plants was determined in each case.

The active compound preparations, amounts applied and test results can be seen from the table which follows.

EXAMPLE E

Fertilisation test/test in the open

Test plant: potted chrysanthemums; variety: Yellow Delaware
Type of soil: sandy loam+30% by volume of peat (white peat)
Test vessel: plastic pots of 1.5 liter capacity A base fertiliser was first added to each pot, and in particular 0.25 g of phosphorus pentoxide in the form of superphosphate and 0.40 g of potassium oxide in the form of potassium magnesia were added per liter of soil. ;p The particular amount desired of the test preparation was then placed on the surface of the soil.

Evaluation was carried out after 3 months. The average growth height and the appearance of the plants were evaluated in each case. The ratings had the following meanings:

1=very dark to dark green
3=medium green
5=light green
0=yellow to chlorotic

The active compound preparations, amounts applied and test results can be seen from the table which follows.

TABLE F

Fertilisation test/test in a greenhouse

| Preparation | mg of W per vessel | Average growth height per plant in cm after | | | Average weight of fresh substance per plant, in g, after 4 months |
|---|---|---|---|---|---|
| | | 7 weeks | 10 weeks | months | |
| without a preparation (= control) | 0 | 15.3 | 18.5 | 24.3 | 11.0 |
| D | 150 | 25.0 | 32.0 | 47.0 | 17.5 |
| | 375 | 22.5 | 33.5 | 53.0 | 18.3 |
| | 750 | 22.0 | 30.0 | 53.5 | 16.8 |
| G | 150 | 23.3 | 32.5 | 47.8 | 19.3 |
| | 375 | 24.0 | 32.8 | 53.3 | 19.0 |

TABLE F-continued

| | | Fertilisation test/test in a greenhouse | | | |
|---|---|---|---|---|---|
| Preparation | mg of W per vessel | Average growth height per plant in cm after | | | Average weight of fresh substance per plant, in g, after 4 months |
| | | 7 weeks | 10 weeks | months | |
| | 750 | 17.3 | 26.0 | 45.5 | 12.0 |
| E | 150 | 24.0 | 30.8 | 48.2 | 17.0 |
| | 375 | 24.0 | 34.5 | 57.2 | 21.8 |
| | 750 | 17.3 | 23.8 | 46.0 | 15.5 |
| F | 150 | 24.3 | 31.8 | 49.3 | 17.5 |
| | 375 | 25.3 | 35.5 | 58.8 | 22.8 |
| | 750 | 15.3 | 23.3 | 47.0 | 18.0 |

EXAMPLE G

Fertilisation test/test in a greenhouse

Test plant: common ryegrass (*Lolium perenne*), 1.8 per vessel

Type of soil: neutral sandy loam soil with 30% by volume of admixed peat fertiliser.

Vessel: plastic buckets, 5 kg of soil per vessel.

Soil moisture during growing: about 70% of the maximum capacity for water at 20° C.

A base fertiliser was first added to each vessel, and in particular 0.9 g of phosphorus pentoxide in the form of Thomas phosphate and 1.5 g of potassium oxide in the form of potassium magnesia were added per liter of soil.

The particular amount desired of the test preparation was then placed on the surface of the soil. Evaluation was carried out at various intervals of time. The average fresh weight of grass cut was determined in each case.

The active compound preparations, amounts applied and test results can be seen from the table which follows.

TABLE G

| | | Fertilisation test/test in a greenhouse Average fresh weight per vessel, in g, after | | | | | | |
|---|---|---|---|---|---|---|---|---|
| Preparation | g of N per vessel | 1st cut 3 weeks | 2nd cut 2 months | 3rd cut 4 months | 4th cut 6 months | 5th cut 7 months | 6th cut 8 months | Sum of all cuts |
| without preparation (= control) | 0 | 2.5 | 7.0 | 5.3 | 2.0 | 1.4 | 1.1 | 41.8 |
| G | 1 | 42.4 | 32.5 | 9.1 | 16.9 | 18.9 | 5.1 | 124.9 |
| | 1.5 | 44.4 | 28.8 | 10.7 | 14.3 | 23.4 | 22.4 | 144.0 |
| E | 1 | 40.1 | 25.9 | 8.8 | 10.9 | 8.9 | 3.4 | 98.0 |
| | 1.5 | 42.7 | 25.4 | 10.2 | 4.4 | 16.2 | 12.8 | 111.7 |

PREPARATIVE EXAMPLES

EXAMPLE 1

Comparison experiment: polymerisation of monomeric hydrocyanic acid in the presence of potassium cyanate (see Angew. Chem. 72, (1960) page 380, Example 4)

200 parts by weight of a 30% strength aqueous hydrocyanic acid solution were warmed to 40° to 50° C. in the presence of 1.08 parts by weight of potassium cyanate for 5 hours. The product formed was filtered off, washed successively with distilled water and ethanol and then dried at 80° C. Azulmic acid was obtained in the form of a black powder in a yield of 95% of theory.

Elementary analysis: 41.4% C; 4.0% H; 43.2% N; 11.4% O.

On the basis of the oxygen values given, this azulmic acid, the formula of which is approximately characterised by the formula (I) indicated earlier in this specification, had the empirical formula $C_{24}H_{28}O_5N_{22}$ (see Angew. Chem. 72 (1960) page 383).

Small amounts of monomeric hydrocyanic acid were continuously split off from this polymer, even after careful drying for a long time at room temperature or at 80° C. Subsequent intensive washing and renewed drying, even under a high vacuum, did not stop the splitting back into hydrocyanic acid.

The determination of hydrogen cyanide was carried out by customary methods.

When 2,000 g of the azulmic acid which had been prepared by the method indicated above were stored at 50° C. in a container with a volume of air of 12 liters, after 2 hours a hydrogen cyanide concentration of 0.066 g of hydrogen cyanide per 12 liters of air was measured. A hydrogen cyanide MWC (MWC=maximum workplace concentration) of 4,583 ppm was calculated from this, that is to say a MWC value which was 416 times greater than the legally imposed MWC value of 11 ppm. An azulmic acid of this type is accordingly completely unsuitable for use in practice.

When 10 parts by weight of the azulmic acid prepared by the process described above were treated with 100 parts by weight of distilled water at 100° C. for 3 hours and the concentration of cyanide ions in the filtrate was then determined, a concentration of cyanide ions was found which corresponded to a hydrocyanic acid content of from 26 to over 28 mg per liter of water. Such concentrations of cyanide ions cause destruction and deactivation of important bacteria, and their enzyme systems, occurring in soil.

EXAMPLE 2

Comparison experiment: polymerisation of monomeric hydrocyanic acid by the "running in" process in the presence of ammonia (see German Pat. No. 949,060).

A mixture of 5,600 g of water, 1,400 g of hydrocyanic acid and 88 g of ammonia was polymerised precisely according to the statements contained in Example 1 of German Pat. No. 949,060. After a polymerisation time of about 5 hours at 50° C. and after discontinuing the cooling, the internal temperature rose to 90° C., remained at this level for about one hour and then fell. The azulmic acid formed was isolated, washed with water and dried at 80° C.

Yield: 98% of theory.

Stability to heat:

Storage of 2,000 g of the azulmic acid at 50° C. for two hours (see Example 1): MWC value over 5,000 ppm.

Stability to hydrolysis:

Treatment of 10 parts by weight of the azulmic acid with 100 parts by weight of distilled water at 100° C. for three hours (see Example 1): hydrocyanic acid concentration of 30 to 36 mg per liter of water.

EXAMPLE 3

Comparison experiment: treatment of azulmic acid according to Example 1 with ketones in the absence of water.

In each case 108 g of the azulmic acid prepared according to Example 1 (disregarding the end groups, this amount corresponded on average to 2 base mols of polymerised aminocyanocarbene units having the structure

equivalent weight=54)
were treated with 4 moles of one of the anhydrous ketones mentioned below and with 4 moles of xylene, which acted as an entraining agent for water, in each case for 30 hours at 120° C.: (a) cyclohexanone, (b) methyl ethyl ketone, (c) diethyl ketone and (d) methyl isobutyl ketone.

Besides small amounts of hydrocyanic acid being split off (about 0.5 percent by weight), in all cases no formation of polyketimine, associated with the splitting off of water, took place between the ketones and the amino groups of the azulmic acid. Small amounts of hydrocyanic acid were trapped as cyanohydrins. After the treatment had ended, in each case about 107 g of azulmic acid were isolated, which, according to elementary analysis, was of virtually unchanged composition. These azulmic acid products treated with ketones were not stabilised; small amounts of hydrocyanic acid were split off at room temperature and also at 50° C. Even boiling the azulmic acid with acetone for several hours with continuous removal of the acetone did not lead to polyketimines or to substituted crosslinked condensation products containing aminal groups.

EXAMPLE 4

108 g (=2 base mols) of the azulmic acid prepared by the method described in Example 1 were stirred into 1,000 g (=10 mols) of 30% strength aqueous formalin solution and the mixture was kept at 100° C. for 8 hours. Although the azulmic acid was completely insoluble in the reaction medium, on titration of filtered samples, which were removed from the reaction medium at intervals of one hour in each case, a continuous decrease in formaldehyde was found. A total of about 1.8 mols of formaldehyde was consumed per 2 base mols of aminocyanocarbone units. This corresponded to an amount of about 0.9 mol of formaldehyde per mol of amino groups, which meant that in spite of the topochemical, heterogeneous reaction, almost every amino group in the azulmic acid underwent reaction. The mixture was worked up by a procedure in which the reaction product was filtered off, washed with water and then freed from moisture and traces of formaldehyde with methanol.

Elementary analysis: 44.1% C; 4.4% H; 30.5% N; 21.4% O.

The reaction product was extremely stable towards the splitting off of hydrogen cyanide under the influence of heat. As hydrogen cyanide determinations showed, both at room temperature and at 50° C., only traces of hydrogen cyanide were split off. Hydrocyanic acid could not be detected even at 160° C.

The hydrolysis test described in Example 1 was likewise negative in this case.

Even in the mother liquor of the reaction product, neither monomeric hydrocyanic acid itself nor its reaction product with formaldehyde, that is to say hydroxyacetonitrile, could be detected.

At 100° C. and under the most diverse conditions, the azulmic acid stabilised with formaldehyde in each case had a value of hydrogen cyanide split off of 0 ppm.

Whilst the azulmic acids prepared according to Example 1 dissolved in 1 N aqueous sodium hydroxide solution even in the cold, hydrogen cyanide being split off and a deep black-coloured solution being obtained, the azulmic acid stabilised by reaction with formaldehyde was completely stable and insoluble in 1 N aqueous sodium hydroxide solution.

EXAMPLE 5

108 g (=2 base mols) of the azulmic acid prepared according to Example 1 were stirred into a mixture of 970 ml of water and 25 g of a 30% strength formalin solution (=0.25 mol of formaldehyde) and the mixture was kept at 100° C. for 8 hours. Although only some of the amino groups of the azulmic acid reacted with formaldehyde (aminal formation, methylolation and a crosslinking reaction), after the reaction had ended, a solid product was isolated which was completely resistant towards splitting back into hydrogen cyanide at room temperature. No hydrogen cyanide could be detected even at 50° C. A MWC value of zero thus resulted for the reaction product.

EXAMPLE 6

In each case 100 g of the stabilised azulmic acids prepared according to Example 4 and 5 were stirred at room temperature for 2 hours with (a) 0.33 mol of phosphoric acid or (b) 0.48 mol of nitric acid. The mixtures were then worked up by a procedure in which the black solid product present in each case was filtered off and dried. In this manner, phosphoric acid addition salts and nitric acid addition salts of the azulmic acids, stabilised with formaldehyde, employed were obtained, that is to say compounds in which the particular acid was bonded to the polymer matrix via the amino groups which were still free (=anchor groups) in the stabilised azulmic acids.

EXAMPLE 7

(a) 1,000 g of distilled water and 98 g (1 mol) of phosphoric acid were added to 108 g (2 base mols) of an azulmic acid prepared according to Example 2, after prior drying of the acid, at 80° C. in a closed stirred apparatus and the mixture was heated to 100° C. The reaction mixture was kept at this temperature for 16 hours, and during this time, in which heterogeneous hydrolysis or partial decyclisation took place in the azulmic acid, a stream of nitrogen, serving as a propellant gas, was passed through the reaction mixture at a rate of about 50 ml per minute. The stream of nitrogen issuing from the mixture was passed through two wash bottles connected in series, the first being filled with 200 ml of 1 N aqueous hydrochloric acid in order to bond the ammonia contained in the stream of nitrogen and the second wash bottle being charged with 200 ml of 1 N aqueous sodium hydroxide solution in order to bond the carbon dioxide present in the stream of nitrogen. The amounts of ammonia and carbon dioxide evolved from the azulmic acid were determined titrimetrically at intervals of 1 to 3 hours. After a reaction time of 16 hours, the total amount of ammonia which was formed by hydrolytic production of $F_1$ structural defects of the formula

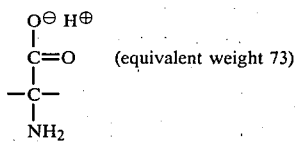 (equivalent weight 73)

was 6.4 g (ca. 0.38 mol). The total amount of carbon dioxide which was formed by decarboxylation of $F_1$ structural defects to give $F_2$ structural defects of the formula

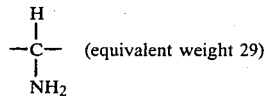 (equivalent weight 29)

was 4.3 g (ca. 0.1 mol) (determined tetrimetrically by the barium carbonate method). A round molar $NH_3/CO_2$ quotient of about 3.8 was calculated from these figures. This numerical value indicated that of about 4 carboxyl groups ($F_1$ structural defects) produced by decyclisation and saponification of nitrile groups of the azulmic acid, about one was decarboxylated and thus led to an $F_2$ structural defect.

The mixture was worked up by a procedure in which the solid reaction product was filtered off, washed and dried. 109 g of a (modified) azulmic acid containing $F_1$ structural defects and $F_2$ structural defects were obtained.

On the basis of this yield information and of the molar $NH_3/CO_2$ quotient determined of 3.8, and on the basis of the fact that the $F_2$ structural defects are formed from the $F_1$ structural defects (0.38 mol $-$ 0.1 mol $=$ 0.28 mol), it could be calculated that 100 parts by weight of the process product contained about 18.6 percent by weight of $F_1$ structural defects and about 2.67 percent by weight of $F_2$ structural defects. The sum of $F_1$ structural defects and $F_2$ structural defects was 21.3 percent by weight.

As the elementary analysis showed, the modified azulmic acid contains about 9.3 percent by weight of phosphoric acid. This phosphoric acid was bonded to the polymer matrix via the free amino groups (anchor groups) of the modified azulmic acid.

(b) A mixture of 100 g of the modified azulmic acid prepared by the method described under (a), 2 moles of formaldehyde and 600 ml of water was heated to 100° C. for 6 hours. Thereafter, the mixture was worked up by a procedure in which the solid product was filtered off, washed and dried. In this manner, 118 g of an azulmic acid containing $F_1$ structural defects and $F_2$ structural defects, which was stabilised with formaldehyde and was extremely stable towards the splitting off of hydrogen cyanide under the influence of heat and under hydrolysis conditions, were obtained. The value for the splitting off of hydrogen cyanide was virtually 0 ppm, even when it was measured under very unfavourable conditions (small volume of air).

As was found in a determination of $NH_2$ groups by the method of van Slyke (see Angew. Chem. 72 (1960), page 382), the modified azulmic acid used as the starting material in the above reaction contained about 21 percent by weight of reactive $NH_2$ groups ($=$ about 1.25 $NH_2$ equivalents) per 100 parts by weight. Accordingly, about 37.5 parts by weight of formaldehyde ($=$ about 1.25 equivalents) should be consumed in the azomethine formation ($-N=CH_2$) and the crosslinking of the azomethine groups by polymerisation. Balancing of the formaldehyde analytically by the peroxide method of Blank and Finkenbeiner (compare Gattermann "Die Praxis des organischen Chemikers" De Gruyter & Co., Berlin 1962, page 180; and Berichte 31, 2979 (1898) showed, however, that only about 0.8 mol of formaldehyde had reacted. Thus, in the stabilized azulmic acid prepared according to the above process from a modified azulmic acid and formaldeyde, either 0.45 equivalent of free amino groups were still present, or this 0.45 equivalent of amino groups had reacted intermolecularly on intramolecularly, with aminal formation, according to the equation which follows.

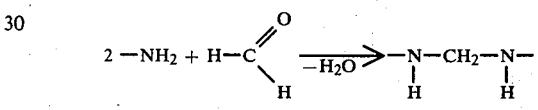

In the latter case, a quantitative condensation of all the amino groups would have been achieved. According to the present state of the analytical methods, it could not be decided which proportion of amino groups had reacted with formaldehyde in the equivalence ratio 1:1 and which proportion of amino groups had been reacted with formaldehyde in the equivalence ratio 2:1.

EXAMPLE 8

In each case 100 g of an azulmic acid, prepared according to Example 7(b), stabilised with formaldehyde were dispersed in 250 g of water and the dispersions were stirred with (a) 10.78 g ($=$0.11 mol) of phosphoric acid or (b) 30.2 g ($=$0.48 mol) of nitric acid at room temperature for 2 hours. Phosphoric acid salts and nitric acid salts of the azulmic acid, stabilised with formaldehyde, employed were obtained in this manner. In this procedure, the inorganic acids were fixed to the polymer matrix via the amino groups which were still free and/or via aminal groups of the formula $>N-CH_2-N<$.

EXAMPLE 9

(a) 1,000 g of distilled water and 0.5 mol of calcium sulphate dihydrate were added to 108 g (2 base mols) of an azulmic acid prepared according to Example 2, after prior drying of the acid, at 80° C. in a closed stirred apparatus and the mixture was heated to 100° C. The reaction mixture was kept at this temperature for 8 hours and, during this time, a stream of nitrogen was passed through at a rate of about 50 ml per minute. The content of ammonia and carbon dioxide in the stream of nitrogen issuing from the reaction mixture was determined in the manner indicated in Example 7. A modified azulmic acid was obtained, the molar $NH_3/CO_2$ quotient of which was 2.68.

(b) A mixture of 100 g of the modified azulmic acid prepared by the method described under (a), 20 g of a 30% strength aqueous formalin solution (=0.2 mol of formaldehyde) and 400 g of water was heated to 100° C. for 8 hours. The mixture was then worked up by a procedure in which the solid product was filtered off, washed and dried. In this manner, an azulmic acid containing $F_1$ structural defects and $F_2$ structural defects and stabilised with formaldehyde was obtained, from which, after prior drying at 30°–50° C., no hydrogen cyanide was split off on subsequent storage at room temperature. The reaction product was soluble in 1 N aqueous sodium hydroxide solution.

EXAMPLE 10

In each case 100 g of the stabilised azulmic acid prepared according to Example 9(b) were stirred at room temperature for 2 hours with (a) an excess of 1 molar phosphoric acid or (b) an excess of 1 molar nitric acid. Thereafter, the solid product was filtered off and dried. Phosphoric acid salts and nitric acid salts of the azulmic acid, stabilised with formaldehyde, employed were obtained in this manner, 0.12 mol of phosphoric acid or 0.51 mol of nitric acid being bonded to 100 parts of weight of stable azulmic acid.

EXAMPLE 11

(a) 1,000 g of deionised water were added to 108 g (2 base mols) of an azulmic acid prepared according to Example 2, after prior drying of the acid, at 80° C. in a closed stirred apparatus and the mixture was heated to 100° C. The reaction mixture, in which the pH value was 6.2, was kept at this temperature for 8 hours, and during this time a stream of nitrogen was passed through at a rate of 50 ml per minute. The content of ammonia and carbon dioxide in the stream of nitrogen issuing from the reaction mixture was determined in the manner indicated in Example 7. The total amount of ammonia evolved was 0.059 mol.

The total amount of carbon dioxide evolved was 0.023 mol.

This gave a molar $NH_3/CO_2$ quotient of 2.57.

By obtaining the difference between the amounts of ammonia and carbon dioxide evolved (0.059−0.023=0.036), it was calculated that about 0.036 equivalent of $F_1$ structural defects was formed and about 0.023 equivalent of $F_2$ structural defects was formed.

Yield of modified azulmic acid: 107 g.

From this yield information, the molar $NH_3/CO_2$ quotient and the difference between the molar amounts of ammonia and carbon dioxide evolved (0.059−0.023=0.036), it was calculated that 100 parts by weight the process product contain about 2.57 percent by weight of $F_1$ structural defects and about 0.7 percent by weight of $F_2$ structural defects.

(b) A mixture of 100 g of the modified azulmic acid prepared by the method described under (a), 20 g of a 30% strength aqueous formalin solution (=0.2 mol of formaldehyde) and 400 g of water was heated to 100° C. for 8 hours. The mixture was then worked up by a procedure in which the solid product was filtered off, washed and dried. In this manner, an azulmic acid containing $F_1$ structural defects and $F_2$ structural defects and stabilised with formaldehyde, was obtained, from which, after prior drying at 30°–50° C., no hydrogen cyanide was split off on subsequent storage at room temperature. The reaction product was soluble in 1 N aqueous sodium hydroxide solution.

EXAMPLE 12

In each case 100 g of the stabilised azulmic acid prepared according to Example 11(b) were stirred with (a) an excess of 1 molar phosphoric acid or (b) an excess of 1 molar nitric acid at room temperature for 2 hours. Thereafter, the solid product was filtered off and dried. Phosphoric acid salts and nitric acid salts of the azulmic acid, stabilised with formaldehyde, employed were obtained in this manner, 0.16 mol of phosphoric acid or 0.54 mol of nitric acid being bonded to 100 parts by weight of stabilised azulmic acid.

EXAMPLE 13

(a) 350 g of approximately 25 percent strength by weight aqueous ammonia solution (=87.5 g (about 5.15 mols) of ammonia) which contained 70 g (1.1 mols) of sodium cyanate, were added to 7 liters of 20% strength aqueous hydrocyanic acid (=1,400 g (52 mols) of hydrogen cyanide), whilst stirring intensively. This mixture was warmed to 40° C. Thereafter, the temperature rose to 70° C. due to the heat of polymerisation liberated. The mixture was heated to 90° C. for a further 4 hours and then worked up by a procedure in which the brown-black polymer obtained, which formed no colloidal solutions in water, was filtered off, washed successively with water and ethanol and then dried at 50°–80° C. under reduced pressure.

Yield: 94.9% of theory.

Elementary analysis: 40.6% C; 4.1% H; 42.4% N; 12.8% O.

The concentration of carbonate detected in the mother liquor of the polymerisation mixture corresponded to an amount of carbon dioxide evolved of about 0.02 mol per 100 g of polymer. Accordingly, 0.56 percent by weight of $F_2$ structural defects had already been introduced into the product during the preparation of the polymer. Furthermore, on the basis of a molar $NH_3/CO_2$ quotient of about 4, such as had been found for hydrolysis of sodium cyanate-free azulmic acid at 90° C. for two hours in a parallel experiment, an amount of ammonia of 0.08 mol had been evolved per 100 g of the polymer prepared, which corresponded to a content of $F_1$ structural defects of 4 percent by weight.

Thus, the polymer prepared in the above process was an azulmic acid containing $F_1$ structural defects and $F_2$ structural defects, that is to say a modified azulmic acid.

(b) When 100 g of the modified azulmic acid prepared by the method described under (a) were reacted with 0.2 mol of formaldehyde under the conditions indicated in Example 7(b), an azulmic acid containing structural defects and stabilised with formaldehyde was formed, from which no hydrogen cyanide was split off at room temperature. The detection of hydrogen cyanide carried out with small Dräger tubes was negative (0 ppm of hydrogen cyanide).

EXAMPLE 14

When 100 g of the modified azulmic acid prepared according to Example 13(a), were reacted with 0.2 mol of glyoxal under the conditions indicated in Example 7(b), an azulmic acid containing structural defects and stabilised with glyoxal was formed, from which no hydrogen cyanide was split off at room temperature. A hydrogen cyanide detection which was carried out, using a small Dräger tube, in the volume of air over a sample of the process product stored at room temperature was negative.

EXAMPLE 15

108 g of the modified azulmic acid prepared according to Example 13(a) were stirred into 1,000 g (=10 mols) of 30% strength aqueous formalin solution and the mixture was kept at 100° C. for 8 hours. The mixture was then worked up by a procedure in which the reaction product was filtered off, washed with water and then freed from moisture and traces of formaldehyde with methanol. 150 g of stabilised azulmic acid were obtained, from which no hydrogen cyanide was split off even at 180° C. In the case of a sample stored at 60° C., a value for the splitting off of hydrogen cyanide of 0 ppm was measured.

EXAMPLE 16

(a) 4 liters of 20% strength aqueous hydrocyanic acid, 200 ml of approximately 25% strength aqueous ammonia solution and 40 g of sodium cyanate were stirred together. This reaction mixture was heated to 90° C. in the course of 2 hours. Thereafter, the mixture was stirred at 90° C. for a further 30 minutes, using a very effective reflux condenser and utilising the hydrocyanic acid reflux, 500 ml of water and a small amount of hydrocyanic acid were then distilled off and 500 ml of water were again added. The mixture was then stirred at 100° C. for 5 hours. The black process product thereby obtained, which could be filtered excellently, was filtered off, washed successively with about 4 liters of water and with methanol and dried under reduced pressure.

Yield: 845 g of azulmic acid containing $F_1$ structural defects and $F_2$ structural defects.

Content of structural defects: about 11 percent by weight.

Elementary analysis: 38.2% C; 4.9% H; 38.8% N; 18.9% O.

As can be seen from these values, the product had a higher oxygen content and a lower nitrogen content than the azulmic acid prepared according to Example 1. This indicated that the product contains a large proportion of structural defects ($F_1$ and $F_2$).

(b) 108 g of the modified azulmic acid prepared by the method described under (a) were stirred into 1,000 g (=10 mols) of 30% strength aqueous formalin solution and the mixture was kept at 100° C. for 8 hours. The mixture was then worked up by a procedure in which the reaction product was filtered off, washed with water and then freed from moisture and traces of formaldehyde with methanol. 140 g of stabilised azulmic acid were obtained, from which no hydrogen cyanide was split off even at 200° C. (test for hydrogen cyanide using a small Dräger tube).

Elementary analysis: 45.1% C; 5.1% H; 31.3% N; 18.6% O.

EXAMPLE 17

(a) When the hydrocyanic acid polymerisation described in Example 16(a) was carried out with the aid of aqueous ammonia solution and sodium cyanate, as the catalyst, at 40° C. under the conditions indicated in Example 1, an azulmic acid was obtained which was virtually free from structural defects and thus had a relatively low oxygen content.

Elementary analysis: 41.6% C; 3.9% H; 45.8% N; 7.5% O.

(b) 108 g of the azulmic acid prepared by the method described under (a) were stirred into 1,000 g (=10 mols) of 30% strength aqueous formalin solution and the mixture was kept at 100° C. for 8 hours. The mixture was then worked up by a procedure in which the reaction product was filtered off, washed with water and then freed from moisture and traces of formaldehyde with methanol. 145 g of stabilised azulmic acid were obtained, from which no hydrogen cyanide was split off even at 200° C. (test for hydrogen cyanide using a small Dräger tube).

Elementary analysis: 45.9% C; 4.9% H; 32.6% N; 16.8% O.

As can be seen from these values, this stabilised azulmic acid also contained structural defects. The latter had thus been introduced in the course of the reaction of the azulmic acid virtually free from structural defects, which is used as the starting material, with formaldehyde.

EXAMPLE 18

A mixture of 108 g of the modified azulmic acid prepared according to Example 16(a) (content of structural defects about 11 percent by weight), 0.5 mol of imidazole and 800 ml of water was warmed to 100° C. for 20 hours. The mixture was then worked up by a procedure in which the solid product was filtered off, washed and dried. A modified azulmic acid was obtained which, on the basis of the balance determined for the splitting off of ammonia and carbon dioxide, contained about 30 percent by weight of $F_1$ structural defects.

When this azulmic acid containing a high proportion of structural defects was reacted with formaldehyde under the conditions indicated in Example 4, a stabilised azulmic acid was obtained, from which no hydrogen cyanide was split off, even on prolonged storage at 50° C.

EXAMPLE 19

(a) A mixture of 200 g of the azulmic acid prepared according to Example 13(a), with a relatively low content of structural defects (composition: 40.6% C; 4.1% H; 42.4% N; 12.8% O) and 800 g of a 25% strength aqueous ammonia solution was stirred at 25°–31° C. for 8 hours. The black powder was then filtered off, washed with 5 liters of water and dried at room temperature in a vacuum drying cabinet.

Yield: 215 g of a modified azulmic acid which contained about 6–7 percent by weight of ammonia bonded to $F_1$ structural defects. The formula of modified $F_1$ structural defects of this type could be illustrated as follows:

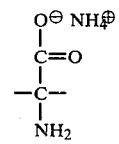

Elementary analysis: 37.6% C; 4.8% H; 38.5% N; 19.4% O.

When the process product was dried not at room temperature but at higher temperatures, ammonia was readily split off.

(b) By reacting 100 g of the modified azulmic acid containing ammonia, prepared by the method described under (a), with 0.2 mol of formaldehyde at 50° C. in an aqueous solution, a product was obtained which did not tend to split off hydrogen cyanide at temperatures up to 30° C.

A stream of nitrogen was passed over some of this process product at 50° C. for four hours at a flow rate of 100 ml of nitrogen per minute. No hydrogen cyanide could be detected analytically in the gas collected (hydrogen cyanide concentration = 0 ppm).

Ammonia was readily split off from the process product both under hydrolysis conditions and under the influence of heat. At 50° C. a proportion of ammonia of 1.43 percent by weight was liberated in the course of one hour.

When the process product which smelled slightly of ammonia, was gassed in the moist state with carbon dioxide, a virtually odourless powder was obtained.

(c) Some of the product prepared according to (b) was washed thoroughly with water and once again treated with 25% strength aqueous ammonia solution for renewed production of structural defects. The product thereby formed exhibited no tendency to split off hydrogen cyanide even at 50° C.

EXAMPLE 20

(a) A mixture of 200 g of the azulmic acid prepared according to Example 13(a), with a relatively low content of structural defects, and 800 g of a 25% strength aqueous ammonia solution was stirred at 80° C. in a closed apparatus for 3 hours. The black powder was then filtered off, washed with 5 liters of water and dried at room temperature in a vacuum drying cabinet. A modified azulmic acid was obtained which contained about 13 percent by weight of ammonia bonded to $F_1$ structural defects.

(b) By reacting 100 g of the modified azulmic acid containing ammonia, prepared by the method described under (a) with 0.2 mol of formaldehyde at 50° C. in an aqueous solution, a product was obtained which did not tend to split off hydrogen cyanide at temperatures up to 60° C.

Ammonia was readily split off from the process product both under hydrolysis conditions and under the influence of heat.

(c) Some of the product prepared according to (b) was washed thoroughly with water and once again treated with 25% strength aqueous ammonia solution for renewed production of structural defects. The product thereby formed exhibited no tendency to split off hydrogen cyanide even at 70° C.

EXAMPLE 21

(a) A mixture of 108 g of the azulmic acid prepared according to Example 13(a), 14 g of calcium thiosulphate hexahydrate and 800 ml of water was warmed to 100° C. for 1.6 hours. The mixture was then worked up by a procedure in which the solid product was filtered off, washed and dried. A modified azulmic acid was obtained which, on the basis of the amounts of ammonia and carbon dioxide evolved, contained about 3.3 percent by weight of $F_1$ structural defects additionally formed and about 1.4 percent by weight of $F_2$ structural defects additionally formed.

(b) By reacting 100 g of the modified azulmic acid prepared according to (a) with 0.2 mol of formaldehyde at 50° C. in an aqueous solution, a product was obtained from which no hydrogen cyanide was split off even on storage at 30° C. for several months. A hydrogen cyanide concentration of 0 ppm was measured in the volume of air in a vessel which was half-filled with the process product.

EXAMPLE 22

(a) A mixture of 108 g of the modified azulmic acid prepared according to Example 13(a), 19 g of calcium dihydrogen sulphide hexahydrate and 800 ml of water was warmed to 100° C. for 2 hours. The mixture was then worked up by a procedure in which the solid product was filtered off, washed and dried. A modified azulmic acid was obtained which contained about 2 percent by weight of calcium and, as was given by the amounts of ammonia and carbon dioxide evolved, had an approximate content of $F_1$ structural defects additionally formed of 7 percent by weight and of $F_2$ structural defects additionally formed of 0.9 percent by weight.

(b) By reacting 100 g of the modified azulmic acid prepared according to (a) with 0.2 mol of formaldehyde at 50° C., in an aqueous solution, a product was obtained from which no hydrogen cyanide was split off even on storage at 30° C. for several months. A hydrogen cyanide concentration of 0 ppm was measured in the volume of air in a vessel which was half-filled with the process product.

EXAMPLE 23

(a) A mixture of 108 g of the modified azulmic acid prepared according to Example 13(a) and 1,000 ml of a 1 N aqueous potassium hydroxide solution was warmed to 100° C. for 44 hours. The azulmic acid employed was thereby already completely dissolved a few minutes after the start of the reaction.

The progress of the saponification reaction was monitored by measuring the amounts of ammonia and carbon dioxide evolved. The amount of ammonia liberated was 12.2 g after 8 hours, 15 g after 22 hours and 17 g ($=1$ mol) after 44 hours.

In a parallel experiment carried out under exactly the same conditions, it was found that by acidifying the reaction mixture with 2 mols of aqueous hydrochloric acid, about 21.9 g ($=0.5$ mol) of carbon dioxide were bonded in the solution as potassium carbonate.

The mixture was worked up by a procedure in which the brown-black aqueous reaction solution was concentrated under 14 mm Hg, methanol was added three times, in an amount of 1 liter each time, to the brown-black dispersion thereby formed and each time the mixture was concentrated by distilling off the methanol and the water still present, and the crystals which remained were then boiled up briefly once again with 800 ml of methanol and filtered off. 113 g of a water-soluble product with a humus-like colour were obtained.

Elementary analysis: 31.5% C; 3.9% H; 26.8% N; 21.0% O; 16.1% K.

The amounts measured of ammonia and carbon dioxide liberated gave a molar $NH_3/CO_2$ quotient of 2.

The difference between the numbers of mols of ammonia and carbon dioxide determined was about 0.5. This factor indicates that about half of all the $F_1$ structural defects had been converted into $F_2$ structural defects.

On the basis of these figures, it was calculated that 100 parts by weight of the process product contained about 55 percent by weight of potassium salt $F_1$ structural defects of the formula

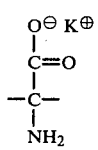

and about 14.5 percent by weight of $F_2$ structural defects. In this method for producing structural defects, in each case one potassium salt $F_1$ structural defect of the above formula was accordingly formed per 2 cyclic units of the azulmic acid. In the ideal case, a product of this type can be illustrated by the formula which follows:

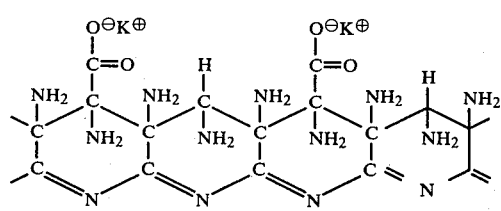

If both the polymolecularity of the process product and the fact that oxygen atoms in the form of carbonyl groups (which help to increase the oxygen content) were present in the "anionic" and "cationic" portion of end groups in the azulmic acid, the values found in the elementary analysis were in relatively good agreement with those for products which have average molecular weights of between 600 and 800. By way of comparison, the elementary composition which follows was calculated for a single compound of the empirical formula $C_{21}H_{28}N_{17}O_9K_3$ (molecular weight=789): 32.4% C; 3.5% H; 30.5% N; 18.5% O; 15.1% K The process product, which could be described as a polyelectrolyte, contained a low-molecular fraction which was particularly readily soluble in water and, on the basis of its elementary composition, could be illustrated approximately by the formula which follows:

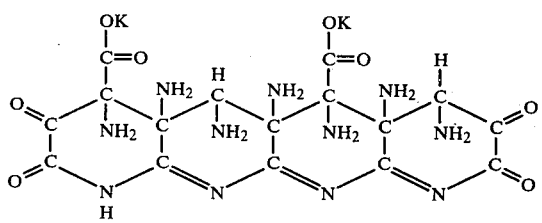

(molecular weight 569)

Elementary analysis of the low-molecular product 35.7% C; 2.5% H; 23.5% N; 23.7% O; 14.5% K.

(b) By reacting the azulmic acid potassium salt prepared by the method described under (a) with formaldehyde in an aqueous solution, an azulmic acid potassium salt/formaldehyde condensation product was formed which was stable towards the splitting off of hydrogen cyanide.

The salts, listed in Table 1 which follows, of modified azulmic acids were also obtained by the method described in Example 23(a) by reacting azulmic acid prepared according to Example 13(a) with the corresponding bases or basic salts:

TABLE 1

| Example No. | Base or salt | Product | Colour |
|---|---|---|---|
| 24(a) | $K_2CO_3$ | Azulmic acid potassium salt | humus-coloured |
| 25(a) | $KHCO_3$ | Azulmic acid potassium salt | humus-coloured |
| 26(a) | $Na_2S$ | Azulmic acid sodium salt | humus-coloured |
| 27(a) | $K_2S$ | Azulmic acid potassium salt | humus-coloured |
| 28(a) | $Na_2S_2O_3$ | Azulmic acid sodium salt | humus-clooured |
| 29(a) | LiOH | Azulmic acid lithium salt | humus-coloured |

The compounds listed in Table 2 which follows were obtained from the azulmic acid potassium salt, prepared according to Example 23(a), by reaction with metal halides, metal hydroxides, metal nitrates or metal sulphates in an aqueous solution.

TABLE 2

| Example No. | Metal salt or base | Product |
|---|---|---|
| 30(a) | $Ca(OH)_2$ | Azulmic acid calcium salt |
| 31(a) | $Ba(OH)_2$ | Azulmic acid barium salt |
| 32(a) | $PbCL_4$ | Azulmic acid lead salt |
| 33(a) | $MgCl_2$ | Azulmic acid magnesium salt |
| 34(a) | $SrCl_2$ | Azulmic acid strontium salt |
| 35(a) | $FeSO_4$ | Azulmic acid iron salt |
| 36(a) | $CoSO_4$ | Azulmic acid cobalt salt |
| 37(a) | $CuSO_4$ | Azulmic acid copper salt |
| 38(a) | $MnSO_4$ | Azulmic acid manganese salt |
| 39(a) | $NiCl_2$ | Azulmic acid nickel salt |
| 40(a) | $ZnSO_4$ | Azulmic acid zinc salt |
| 41(a) | $SnCl_4$ | Azulmic acid tin salt |
| 42(a) | $CdSO_4$ | Azulmic acid cadmium salt |
| 43(a) | $Bi_2(SO_4)_3$ | Azulmic acid bismuth salt |
| 44(a) | $Al_2(SO_4)_3$ | Azulmic acid aluminium salt |
| 45(a) | $AgNO_3$ | Azulmic acid silver salt |
| 46(a) | $HgCl_2$ | Azulmic acid mercury salt |
| 47(a) | $AuCl_3$ | Azulmic acid gold salt |

The condensation products listed in Table 3 below were also obtained by the method indicated in Example 23(b), from the corresponding salts of azulmic acid and formaldehyde.

TABLE 3

| Example No. | Formaldehyde condensation product of: | |
|---|---|---|
| 26(b) | Azulmic acid sodium salt | (26a) |
| 29(b) | Azulmic acid lithium salt | (29b) |
| 30(b) | Azulmic acid calcium salt | (30b) |
| 31(b) | Azulmic acid barium salt | (31a) |
| 32(b) | Azulmic acid lead salt | (32a) |
| 33(b) | Azulmic acid magnesium salt | (33a) |
| 34(b) | Azulmic acid strontium salt | (34a) |
| 35(b) | Azulmic acid iron salt | (35a) |
| 36(b) | Azulmic acid cobalt salt | (36a) |
| 37(b) | Azulmic acid copper salt | (37a) |
| 38(b) | Azulmic acid manganese salt | (38a) |
| 39(b) | Azulmic acid nickel salt | (39a) |
| 40(b) | Azulmic acid zinc salt | (40a) |
| 41(b) | Azulmic acid tin salt | (41a) |
| 42(b) | Azulmic acid Cadmium salt | (42a) |
| 43(b) | Azulmic acid bismuth salt | (43a) |
| 44(b) | Azulmic acid aluminium salt | (44a) |
| 45(b) | Azulmic acid silver salt | (45a) |
| 46(b) | Azulmic acid mercury salt | (46a) |
| 47(b) | Azulmic acid gold salt | (47a) |

EXAMPLE 48

A mixture of 108 g (2 base mols) of the azulmic acid prepared according to Example 1, 4 mols of glyoxal, 1,000 g of distilled water and 100 g of ethanol was warmed to 100° C. for 16 hours, whilst stirring intensively. The mixture was then worked up by a procedure in which the solid product was filtered off, washed and dried. 140 g of an azulmic acid/glyoxal condensation product were obtained, from which no hydrogen cyanide was split off even on prolonged storage at temperatures between 20° and 40° C.

From the amount of carbon dioxide evolved during the reaction and on the basis of a molar $NH_3/CO_2$ quotient of 3.2, the process product contained between 4 and 6 percent by weight of $F_1$ structural defects and $F_2$ structural defects. The above condensation reaction therefore proceeded with simultaneous production of structural defects.

The condensation products listed in Table 4 below were obtained by the method described in Example 48, by reacting in each case 108 g of the azulmic acid prepared according to Example 1 with 4 mols of the appropriate aldehyde.

TABLE 4

| Example No. | Aldehyde | Product | Yield (in g) |
|---|---|---|---|
| 49 | Acetaldehyde | Az/acetaldehyde condensation product | 115 |
| 50 | Propionaldehyde | Az/propionaldehyde condensation product | 126 |
| 51 | Isobutyraldehyde | Az/isobutyraldehyde condensation product | 124 |
| 52 | Hydroxypivalaldehyde | Az/hydroxypivalaldehyde condensation product | 125 |
| 53 | Acrolein | Az/acroleinaldehyde condensation product | 143 |
| 54 | Glucose | Az/glucose condensation product | 128 |
| 55 | Salicylaldehyde | Az/salicylaldehyde condensation product | 121 |
| 56 | Furfurol | Az/furfurol condensation product | 125 |
| 57 | ω-Hydroxymethyl-furfurol | Az/ω-hydroxymethyl-furfurol condensation product | 139 |
| 58 | Chloral hydrate | Az/chloralhydrate condensation product | 149 |

"Az" in each case represents "azulmic acid".

EXAMPLE 59

A mixture of 108 g of the azulmic acid prepared according to Example 13(a), 0.3 mol of formaldehyde, 600 g of distilled water and 100 g of finely powdered ash of tobacco leaves (composition of the ash, calculated relative to oxides of the elements: 29.1% of $K_2O$; 3.2% of $Na_2O$; 36.0% of $CaO$; 7.4% of $MgO$; 1.9% of $Fe_2O_3$; 4.7% of $P_2O_5$; 3.1% of $SO_3$; 5.8% of $SiO_2$ and 6.7% of $Cl_2$) was warmed to 100° C. for 6 hours, whilst stirring intensively. The mixture was then worked up by a procedure in which the solid product was filtered off, washed and dried. 195 g of an azulmic acid/formaldehyde condensation product which contained tobacco ash and had an excellent stability towards the splitting off of hydrocyanic acid were obtained.

Measurement of the amounts of ammonia and carbon dioxide evolved during the reaction showed that the condensation reaction proceeded with simultaneous production of structural defects.

The condensation products listed in Table 5 below were obtained by the method described in Example 59, by reacting in each case 108 g of the azulmic acid prepared according to Example 13(a) with 0.3 mol of formaldehyde in the presence of additives.

TABLE 5

| Example No. | Additive | Amount of additive employed [g] | Yield (in g) |
|---|---|---|---|
| 60 | Finely powdered ash of willow wood | 100 | 198 |
| 61 | Ash residues of broom, beech and birch leaves in the ratio 1:1:1 (dry weight) | 100 | 196 |
| 62 | Ash of spruce wood | 100 | 199 |
| 63 | Customary garden mould with a moisture content of about 40% by weight | 424 | 377 |
| 64 | Polymethyleneurea of the formula $H_2N-\overset{O}{\overset{\|}{C}}-NH-(CH_2-NH-\overset{O}{\overset{\|}{C}}-NH)_{4-14}H$ | 100 | 205 |
| 65 | Peat | 100 | 180 |
| 66 | 1:1 mixture of insoluble calcium cyanate and calcium cyanamide | 100 | 185 |
| 67 | Powdered, sparingly soluble isobutyraldehyde/urea condensate (molar ratio 1:1) | 100 | 197 |
| 68 | Powdered, sparingly soluble isobutyraldehyde/urea condensate (molar ratio 2:1) | 100 | 193 |
| 69 | Isobutyraldehyde/urea condensate (molar ratio 1:2.5) | 100 | 190 |
| 70 | Powdered, sparingly soluble crotonaldehyde/urea condensate (molar ratio 1:2) | 100 | 189 |
| 71 | Powdered, sparingly soluble | | |

TABLE 5-continued

| Example No. | Additive | Amount of additive employed [g] | Yield (in g) |
|---|---|---|---|
|  | crotonaldehyde/urea condensate (molar ratio 1:1) | 100 | 193 |
| 72 | Powdered, sparingly soluble crotonaldehyde/urea condensate, prepared from 1 mol of crotonaldehyde and 2 mols of urea, essentially consisting of | 100 | 204 |
| 73 | Ground basic slag | 100 | 205 |
| 74 | Phosphorite | 100 | 203 |
| 75 | Rhenania phosphate | 100 | 198 |
| 76 | Active charcoal powder | 100 | 204 |
| 77 | Hydrated alumina | 100 | 207 |
| 78 | Silicon dioxide | 100 | 206 |

$$\begin{array}{c} O \\ \| \\ C \\ HN \diagup \diagdown NH \\ | \quad\quad | \\ H_3C-CH \quad CH-NH-C-NH_2 \\ \diagdown \diagup \quad\quad \| \\ CH_2 \quad\quad O \end{array}$$

EXAMPLE 79

(a) 34 g of approximately 25% strength aqueous ammonia solution, which contained 6.8 g of sodium cyanate, were added to 600 ml of 18% strength aqueous hydrocyanic acid and 100 g of polymethyleneurea, whilst stirring intensively. After warming the mixture to 40° C., the temperature rose to 70° C. due to the heat of polymerisation liberated. The mixture was heated to 90° C. for a further 4 hours and then worked up by a procedure in which the polymer was filtered off, washed successively with water and ethanol and then dried under reduced pressure.

Yield: 201 g of modified azulmic acid which contained polymethyleneurea.

Nitrogen content of the process product: 38.9%.

(b) A mixture of 200 g of the modified azulmic acid prepared according to (a), containing polymethyleneurea, 200 ml of a 30% strength aqueous formalin solution (=2 mols of formaldehyde) and 1,200 ml of distilled water was heated to 100° C. for 3 hours. After working up, a pulverulent azulmic acid/polymethyleneurea/formaldehyde condensation product was obtained which was completely stable towards the splitting off of hydrogen cyanide. On prolonged storage, a hydrogen cyanide concentration of 0 ppm was measured in vessels containing air. About 1.6 mols of formaldehyde had been taken up during the condensation reaction.

Modified azulmic acids containing the additives listed in Table 6 below were also prepared by the method described in Example 79(a). In each case 1 liter of 19.2% strength aqueous hydrocyanic acid was polymerised in the presence of, in each case, 180 g of additive.

TABLE 6

| Example No. | Additive | Yield (in g) | Nitrogen content of the product |
|---|---|---|---|
| 80(a) | Active charcoal | 342 | 22.9% |
| 81(a) | Bleaching earth | 340 | 22.7% |
| 82(a) | Asbestos flour | 354 | 20.1% |
| 83(a) | Trilon B | 170 | 41.8% |
| 84(a) | Starch (insoluble) | 342 | 22.4% |
| 85(a) | Fly ash "M" | 353 | about 22% |
| 86(a) | Peat (moist) | 155 | 31.3% |

The azulmic acid/additive/formaldehyde condensation products listed in Table 7 below were also prepared by the method described in Example 79(b).

TABLE 7

| Example No. | Condensation product of |  |
|---|---|---|
| 80(b) | Az/active charcoal + formaldehyde | (80a) |
| 81(b) | Az/bleaching earth + formaldehyde | (81a) |
| 82(b) | Az/asbestos flour + formaldehyde | (82a) |
| 83(b) | Az/Trilon B + formaldehyde | (83a) |
| 84(b) | Az/starch (insoluble) + formaldehyde | (84a) |
| 85(b) | Az/fly ash "M" + formaldehyde | (85a) |
| 86(b) | Az/peat (moist) + formaldehyde | (86a) |

"Az" in each case represents "azulmic acid"

EXAMPLE 87

100 g of the azulmic acid prepared according to Example 13(a) and stabilised by condensation with a little formaldehyde were stirred with an excess of aqueous nitric acid at room temperature for 10 minutes. Thereafter, the solid product was filtered off and washed with a little water. An azulmic acid-nitric acid adduct was obtained in which 0.51 mol of nitric acid were bonded per 100 parts by weight of stabilised azulmic acid. Accordingly, in spite of a heterogeneous reaction of about 4 amino groups which were present in about 216 parts by weight of the azulmic acid employed, on average one amino group within the polycyclic matrix was converted into a grouping of the formula

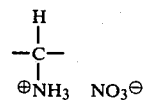

Elementary analysis of the product isolated: 35.2% C; 4.3% H; 38.9% N; 20.9% O.

The process product contained about 19.2% by weight of nitrate ions.

Since in the case of the preparation of azulmic acids of this type, containing nitrate ions, there is the danger that when the products are washed with a large quantity of water some of the nitrate ions contained therein dissociate off, it is appropriate to wash the product only with a little water and to gas the moist powder, which still contains portions of nitric acid which is not ionically bonded, with ammonia. Nitric acid which is not ionically bonded is converted into ammonium nitrate by this measure.

EXAMPLE 88

100 g of the azulmic acid prepared according to Example 13(a) and stabilised by condensation with a little formaldehyde was stirred with an excess of 2 normal aqueous nitric acid at room temperature for 5 minutes. Thereafter, the solid product was filtered off and washed with a little water. An azulmic acid-nitric acid adduct was obtained in which 0.64 mol of nitric acid were bonded per 100 parts by weight of stabilised azulmic acid. Accordingly, on average about 1.3 amino group equivalents were used for salt formation with nitric acid per 4 amino group equivalents in 216 parts by weight of stabilised azulmic acid.

Further experiments showed that the proportion of nitric acid absorbed was greater, the more finely divided (for example particle size <100μ) was the stabilised azulmic acid employed.

The adducts listed in Table 8 below were also obtained by the method described in Example 87, by reacting in each case 100 parts by weight of an azulmic acid stabilised with a little formaldehyde with an excess of the particular acid.

TABLE 8

| Example No. | Adduct of | Amount of acid bonded per 100 g of azulmic acid |
|---|---|---|
| 89 | Az + oleic acid | 0.33 mol |
| 90 | Az + ricinoleic acid | 0.25 mol |
| 91 | Az + dibutylphosphoric acid | 0.25 mol |
| 92 | Az + 2-ethylcaproic acid | 0.35 mol |
| 93 | Az + acrylic acid | 0.38 mol |
| 94 | Az + methacrylic acid | 0.4 mol |
| 95 | Az + maleic acid | 0.4 mol |
| 96 | Az + maleic acid oleyl alcohol monoester | 0.34 mol |

"Az" in each case represents "stabilised azulmic acid".

The compounds listed in Example 89–96 had a hydrophobic character.

EXAMPLE 97

100 g of azulmic acid stabilised with formaldehyde and with a content of $F_1$ structural defects of about 2.6 percent by weight and a content of $F_2$ structural defects of 0.6 percent by weight were stirred with 0.5 mol of cadmium (II) chloride and 600 ml of distilled water at room temperature for 6 hours. Thereafter, the solid product was filtered off, washed thoroughly with water and dried at 100° C. A black finely powdered product with a cadmium content of 8.1 percent by weight was isolated. The process product was azulmic acid, stabilised with formaldehyde which contained cadmium(II) chloride bonded as a complex. The azulmic acid complex salt was completely stable towards the splitting off of hydrogen cyanide.

The complex salts listed in Table 9 below were also obtained by the method described in Example 97, by reacting in each case 100 g of azulmic acid stabilised with formaldehyde with in each case 0.5 mol of chloride or sulphate of the corresponding metal.

TABLE 9

| Example No. | Metal Salt | Metal content of the azulmic acid complex |
|---|---|---|
| 98 | $MNSO_4$ | 3.65% by weight |
| 99 | $SnCl_2$ | 23.5% by weight |
| 100 | $CuSO_4$ | 10.4% by weight |
| 101 | $HgCl_2$ | 28.4% by weight |
| 102 | $CoCl_2$ | 5.2% by weight |
| 103 | $ZnCl_2$ | 10.4% by weight |
| 104 | $FeSO_4$ | 6.8% by weight |
| 105 | $PbCl_2$ | 25.8% by weight |
| 106 | $Bi(NO_3)_3$ | 21% by weight |
| 107 | $AgNO_3$ | 26.7% by weight |

EXAMPLE 108

(a) A mixture of 108 g of azulmic acid which was almost free from structural defects, 1 mol of the azulmic acid-cadmium chloride complex prepared according to Example 97 and 1,000 g of distilled water was stirred at 70° C. for 8 hours. The solid product was then filtered off, washed and dried. An azulmic acid-cadmium chloride complex with a relatively high content of $F_1$ structural defects and $F_2$ structural defects was obtained. The content of $F_1$ structural defects was about 10–12 percent by weight.

(b) 120 g of the azulmic acid-cadmium chloride complex containing structural defects, prepared by the method described under (a), were treated with 1 mol of formaldehyde in an aqueous medium at 50° C. for 6 hours. Thereafter, the solid product was filtered off, washed and dried. An azulmic acid-cadmium chloride complex stabilised by formaldehyde was obtained, from which no hydrogen cyanide was split off even at 180° C. The product had a cadmium content of 17.3 percent by weight.

(c) 120 g of the product prepared according to (b) were stirred with an excess of 1 N aqueous sodium hydroxide solution at 25° C. for 2 hours. Thereafter, the solid product was filtered off, washed and dried. An azulmic acid-cadmium hydroxide complex stabilised by formaldehyde was obtained.

The azulmic acid complexes, containing structural defects, listed in Table 10 below were obtained in the manner indicated in Example 108 under (a) by reacting azulmic acid which was relatively free from structural defects with the corresponding azulmic acid-metal salt complex.

TABLE 10

| Example No. | Azulmic acid-metal salt complex | Content of $F_1$ structural defects [%] |
|---|---|---|
| 109(a) | Az-$MnSO_4$ complex | 9 |
| 110(a) | Az-$SnCl_2$ complex | 12 |
| 111(a) | Az-$CuSO_4$ complex | 8 |
| 112(a) | Az-$HgCl_2$ complex | 7 |
| 113(a) | Az-$CoCl_2$ complex | 10.5 |
| 114(a) | Az-$ZnCl_2$ complex | 13 |
| 115(a) | Az-$FeSO_4$ complex | 8 |
| 116(a) | Az-$PbCl_2$ complex | 9 |
| 117(a) | Az-$Bi(NO_3)_3$ complex | 8 |

TABLE 10-continued

| Example No. | Azulmic acid-metal salt complex | Content of $F_1$ structural defects [%] |
|---|---|---|
| 118(a) | Az-AgNO$_3$ complex | 7 |

"Az" in each case represents "azulmic acid".

The azulmic acid-metal salt complexes listed in Table 10 were subjected to a condensation reaction with formaldehyde by the method indicated in Example 108 under (b). The azulmic acid-metal salt complexes, stabilised with formaldehyde, listed in Table 11 below were thereby obtained.

TABLE II

| Example No. | Formaldehyde condensation product of: | Metal content |
|---|---|---|
| 109(b) | Az-MnSO$_4$ complex according to Example 109(a) | 3.2% of Mn |
| 110(b) | Az-SnCl$_2$ complex according to Example 110(a) | 18% of Sn |
| 111(b) | Az-CuSO$_4$ complex according to Example 111(a) | 9.6% of Cu |
| 112(b) | Az-HgCl$_2$ complex according to Example 112(a) | 26% of Hg |
| 113(b) | Az-CoCl$_2$ complex according to Example 113(a) | 5.3% of Co |
| 114(b) | Az-ZnCl$_2$ complex according to Example 114(a) | 9.5% of Zn |
| 115(b) | Az-FeSO$_4$ complex according to Example 115(a) | 7.2% of Fe |
| 116(b) | Az-PbCl$_2$ complex according to Example 116(a) | 23.8% of Pb |

"Az" in each case represents "azulmic acid"

When silver salt complexes, gold salt complexes or platinum salt complexes of azulmic acid were used, products stabilised with formaldehyde and with a metal content of over 29 percent by weight could be prepared.

EXAMPLE 119

A mixture of 100 g of azulmic acid which was almost free from structural defects, 17 g of copper nitrate trihydrate, 300 g of formic acid and 80 g of water was stirred at 60°–70° C. for 6 hours, whilst passing 25 liters of air through per hour. Thereafter, the solid product was filtered off, washed and dried. An azulmic acid-copper nitrate complex with a content of $F_1$ structural defects of about 8.9 percent by weight and a content of $F_2$ structural defects of about 2.3 percent by weight was obtained. 0.8 percent by weight of oxamide which was formed from monomeric hydrocyanic acid which had been split off in the course of the oxidative production of structural defects and simultaneous complexing was also isolated.

The product could be stabilised by reaction with formaldehyde.

EXAMPLE 120

(a) A mixture of 108 g of the azulmic acid prepared according to Example 13(a), 1 mol of iron(II) sulphate and 800 ml of distilled water was stirred at 100° C. for 10 hours. Thereafter, the solid product was filtered off, washed with 5% strength aqueous ammonia solution and dried. An iron complex of azulmic acid was obtained which contained a relatively high proportion of structural defects (up to 20 percent by weight) and had the composition:
30.3% C; 3.6% H; 28.7% N; 26.8% O; 11.5% Fe 120 g of the azulmic acid-iron complex, which contained a high proportion of structural defects, prepared according to (a), were treated with 120 g of 30% strength formaldehyde solution in an aqueous medium at 50° C. for 5 hours. An azulmic acid-iron complex stabilised by condensation with formaldehyde was obtained, from which no hydrogen cyanide was split off even at 180° C.

The azulmic acid-metal salt complexes listed in Table 12 which follows were also prepared by the method indicated in Example 120(a).

TABLE 12

| Example No. | Metal compound used | Composition of the product |
|---|---|---|
| 121(a) | CuSO$_4$ | 24.5% C; 2.2% H; 22.6% N; 23.8% O; 3.3% S; 23.9% Cu |
| 122(a) | FeCl$_3$ | 35.7% C; 3.1% H; 33.3% N; 22.3% O; 1.7% Cl; 4.4% Fe |
| 123(a) | ZnCl$_2$ | 23.5% C; 2.2% H; 21.6% N; 19.1% O; 34.1% Zn |
| 124(a) | CoCl$_2$ | 28.4% C; 2.7% H; 27.8% N; 20.4% O; 20.2% Co |
| 125(a) | Cu(OCOCH$_3$)$_2$ | 22.3% C; 2.6% H; 22.6% N; 18.4% O; 33.9% Cu |
| 126(a) | SnCl$_2$ | 14.7% C; 2.3% H; 12.9% N; 24.8% N; 44.3% Sn |
| 127(a) | MnSO$_4$ | 28.4% C; 3.1% H; 26.6% N; 24.2% O; 17.6% Mn |
| 128(a) | SnCl$_2$ (0.4 mol) | 23.4% C; 2.7% H; 21.0% N; 21.9% O; 25.9% Sn |
| 129(a) | ZnCl$_2$ (0.5 mol) | 29.2% C; 2.6% H; 29.5% N; 19.1% O; 19.8% Zn; |
| 130(a) | PbCl$_2$ | 58.3% Pb |
| 131(a) | Bi(NO$_3$)$_3$ | 59.1% Bi |
| 132(a) | Tl$_2$SO$_4$ | 57.9% Tl |
| 133(a) | TiCl$_4$ (Xylol) | 25.2% Ti |
| 134(a) | Zr(SO$_4$)$_2$ | 38.9% Zr |
| 135(a) | H$_2$WO$_4$ | 55.8% W |
| 136(a) | NiCl$_2$ | 29.2% Ni |
| 137(a) | AgNO$_3$ | 43.1% Ag |
| 138(a) | HgCl$_2$ | 58.3% Hg |
| 139(a) | HAuCl$_4$ | 56% Au |
| 140(a) | H$_2$PtCl$_6$ | 55.5% Pt |

The azulmic acid-metal salt complexes listed in Table 12 were reacted with formaldehyde by the method indicated in Example 120(b). The azulmic acid-metal salt complex condensation products listed in Table 13 which follows were thereby obtained.

TABLE 13

| Example No. | Formaldehyde condensation product of: |
|---|---|
| 121(b) | Az-Cu complex according to Example 121(a) |
| 122(b) | Az-Fe complex according to Example 122(a) |
| 123(b) | Az-Zn complex according to Example 123(a) |
| 124(b) | Az-Co complex according to Example 124(a) |
| 125(b) | Az-Cu complex according to Example 125(a) |
| 126(b) | Az-Sn complex according to Example 126(a) |
| 127(b) | Az-Mn complex according to Example 127(a) |
| 128(b) | Az-Sn complex according to Example 128(a) |
| 129(b) | Az-Zn complex according to Example 129(a) |
| 130(b) | Az-Pb complex according to Example 130(a) |
| 131(b) | Az-Bi complex according to Example 131(a) |
| 132(b) | Az-Tl complex according to Example 132(a) |
| 133(b) | Az-Ti complex according to Example 133(a) |
| 134(b) | Az-Zr complex according to example 134(a) |
| 135(b) | Az-W complex according to Example 135(a) |
| 136(b) | Az-Ni complex according to Example 136(a) |
| 137(b) | Az-Ag complex according to Example 137(a) |
| 138(b) | Az-Hg complex according to Example 138(a) |
| 139(b) | Az-Au complex according to Example 139(a) |
| 140(b) | Az-Pt complex according to Example 140(a) |

"Az" in each case represents "azulmic acid"

No hydrogen cyanide was split off from the products listed in Examples 121(b)-140(b), even at 180° C.

EXAMPLE 141

(a) A mixture of 100 g of azulmic acid which was almost free from structural defects, 100 g of gelatin, 100g of cellulose powder, 0.8 mol of phosphoric acid and 1,200 ml of water was stirred at 60° C. for 2 hours. Thereafter, the solid product was filtered off, washed and dried. A mixed product consisting of azulmic acid and of cellulose powder and gelatin and their degradation products, which contained a relatively high proportion of structural defects and contained phosphoric acid, was isolated.

(b) 120 g of the product prepared according to (a) were treated with 1 mol of formaldehyde in 300 g of water at 50° C. for 5 hours. Thereafter, the solid product was filtered off, washed and dried. A mixed product consisting of azulmic acid, cellulose powder and gelatine and the degradation products of these naturally occurring substances, which is stabilised by condensation with formaldehyde and contains phosphoric acid, is isolated.

EXAMPLE 142

A mixture of 108 g of azulmic acid with a content of $F_1$ structural defects of about 2.5% by weight, a content of $F_2$ structural defects of about 0.5% by weight and a total concentration of amino groups of about 19% by weight (=1.12 $NH_2$ equivalents per 100 g of azulmic acid), 0.2 equivalents of formaldehyde (=6 g in 20 parts by weight of water) and 500 g of distilled water was stirred at 100° C. for 4 hours. The process product was filtered off, washed with water and then stirred with 300 g of a 0.2% strength aqueous ammonia solution at room temperature for one hour, traces of formaldehyde still contained in the mixture being converted into water-soluble hexamethylenetetramine. The product (azulmic acid partially condensed with formaldehyde), which had been isolated by filtration and washed again with water, was then stirred well with 140 g of microbially active garden mould (moisture content 40% by weight) in 500 g of water at 35° C. for 30 hours, whilst passing about 50 ml of air over per minute. On working up the mixture, an ammonia-containing mixed product consisting of partially stabilised azulmic acid and microbially active garden mould was obtained. No hydrogen cyanide could be detected in the filtrate of the reaction product.

A total of 5.56 g of ammonia was evolved whilst stirring the partially stabilised azulmic acid with microbially active garden mould for 30 hours. The carbon dioxide content of 90 liters of air, determined in a parallel experiment, and the amount of carbon dioxide produced by the microbial activity of the 140 g of garden mould (sum=2.5 g of carbon dioxide) were subtracted from this amount. It was thus calculated that 3.06 g (0.07 mol) of carbon dioxide were formed by decarboxylation of $F_1$ structural defects, that is to say newly produced $F_1$ structural defects in the azulmic acid. About 2 percent by weight of $F_2$ is structural defects had accordingly been formed, per 100 g of partially stabilised azulmic acid employed, in the course of the stirring in the presence of the microbially active garden mould. The ammonia produced during the primary formation of $F_1$ structural defects had remained in the process product.

EXAMPLE 143

(a) 108 g of the stabilised azulmic acid, prepared according to Example 4, which was completely free of formaldehyde were dispersed in 1,000 g of deionised water, 103 g (0.3 mol) of cane sugar, 31 g of dried yeast (=standardised purchasable dried yeast preparation from Messrs. Dr. A. Oetker, Bielefeld), 1 g of ammonium carbonate and 1 g of primary potassium phosphate were added and the mixture was stirred at 35° C., whereupon the alcoholic fermentation proceeding according to the equation which follows started immediately.

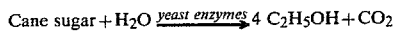

$$\text{Cane sugar} + H_2O \xrightarrow{\text{yeast enzymes}} 4\ C_2H_5OH + CO_2$$

A stream of nitrogen was passed through the apparatus at a rate of 50 ml per minute in order to remove the carbon dioxide thereby formed. The gas mixture issuing from the apparatus was freed from the carbon dioxide it contained, in a receiver charged with 1 normal aqueous sodium hydroxide solution. The amount of carbon dioxide bonded by the sodium hydroxide solution was determined in the form of sodium carbonate was determined titrimetrically by the barium carbonate method after 1, 2, 4 and 8 hours. The results here were always reproducible and showed that, in contrast to a control experiment (yeast preparation, water, cane sugar), the alcohol fermentation process proceeded with only minimum retardation.

After an experiment time of 8 hours, the amount of carbon dioxide evolved was 47 g. This corresponded to a conversion of cane sugar of 94% of theory.

(b) If the fermentation experiment described under (a) was carried out using the azulmic acid prepared according to Example 1, which had not been stabilised, a cane sugar conversion of 18–20% was measured after stirring for eight hours. Accordingly, the yeast enzymes were so severely deactivated by the cyanide ions contained in the reaction mixture that the alcoholic fermentation was drastically inhibited.

The test described under (a) thus makes qualitative detection of cyanide ions possible.

EXAMPLE 144

A mixture of 108 g (2 base mols) of the black, non-stabilised azulmic acid prepared according to Example 1, 500 g of distilled water and 20 g of a 30% strength aqueous formalin solution (=0.2 mol of formaldehyde) was stirred at 100° C. for 4 hours. Thereafter, the solid product was filtered off, washed and dried.

Yield: 112 g of an azulmic acid condensation product which was relatively resistant towards the splitting off of hydrogen cyanide. In the air space of vessels which were half-filled with the process products, a hydrogen cyanide concentration of O ppm was measured after storage at 50° C. for ten days.

The carbon dioxide formed by the production of $F_2$ structural defects during the four hour condensation reaction was determined titrimetrically. A total of 0.88 g (0.02 mol) of carbon dioxide was evolved, which corresponded to a content of $F_2$ structural defects of 0.53 percent by weight.

In a parallel experiment carried out under exactly the same conditions, the mother liquor remaining after filtering off the process product was concentrated. The hexamethylenetetramine, which was formed by reaction of the ammonia formed, during the production of $F_1$ structural defects, with formaldehyde was isolated from the yellowish-brown residue thereby obtained, by extraction with chloroform.

Yield: 2.8 g of hexamethylenetetramine.

Since 140 g of hexamethylenetetramine contained 68 g of ammonia in the bonded form, it was calculated from the yield of hexamethylenetetramine given that about 0.08 mol of ammonia were formed in the course of the condensation reaction. Furthermore, the difference between the molar amounts of ammonia and carbon dioxide showed that 0.06 mol of $F_1$ structural defects had not been converted into $F_2$ structural defects. The content of $F_1$ structural defects in the process product was accordingly about 4 percent by weight. Total amount of structural defects ($F_1$ and $F_2$): 4.53 percent by weight.

From this, it follows that, during the condensation reaction, structural defects had simultaneously been produced.

EXAMPLE 145

(a) The following substances were stirred into 1,800 g of distilled water: 108 g of the modified azulmic acid prepared according to Example 13(a), 10 g of normal peat, 5 g of a commercially available limed peat, 5 g of potassium nitrate, 10 g of calcium cyanamide, 5 g of calcium nitrate, 20 g of a calcium sulphite waste liquor, which contained about 40% of lignin-sulphonates and lignin-carbohydrate compounds, 15 g of calcium dihydrogen phosphate, 5 g of peat which had been prepared by processing peat with waste products of animal and vegetable origin, 10 g of Leuna saltpetre (ammonium sulphate 2 ammonium nitrate), 5 g of calcium ammonium nitrate (ammonium nitrate + calcium carbonate), 5 g of a limed peat fertiliser which consisted of carbonated lime, magnesium carbonate and about 20% by weight of peat, 5 g of a 10% strength solution, rendered alkaline with potassium hydroxide, of humic acids, 50 g of a sparingly soluble condensation product of 1 mol of urea and 1 mol of isobutyraldehyde, 30 g of a polymethyleneurea of the formula

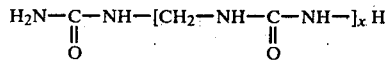

in which $x = 4 - 12$ and 0.5 g of iron(II) sulphate, 0.2 g of copper sulphate, 0.2 g of manganese(II) sulphate and 0.1 g of zinc sulphate. The well-stirred dispersion was heated to 80° C. and kept at this temperature for 4 hours.

(b) In a parallel experiment, 100 g of the modified azulmic acid prepared according to Example 13(a) were treated with the trace element salts listed, in the amounts indicated and under the conditions given under (a), but without further additives. From the ammonia/carbon dioxide balance thereby determined, it was found that about 0.2 mol of ammonia and about 0.05 mol of carbon dioxide were evolved. This gave a molar $NH_3/CO_2$ quotient of 4. The difference between the molar amounts of ammonia and carbon dioxide (0.2−0.05 = 0.15) shows that 0.15 equivalent of $F_1$ structural defects and about 0.05 equivalent of $F_2$ structural defects had been produced. About 10.2% by weight of $F_1$ structural defects and about 1.45% by weight of $F_2$ structural defects had accordingly been formed. Total content of structural defects ($F_1 + F_2$): 11.65% by weight.

On the basis of the results of this comparison experiment, it could be assumed that an analogous concentration of structural defects was present in the process product prepared according to (a).

(c) After the production of structural defects as described under (a), the well-stirred mixture was treated with 300 g of a 30% strength aqueous formalin solution at 30° C. for 3 hours. Thereafter, the water and unreacted formaldehyde were removed by concentrating the reaction mixture under 14 mm Hg until it had a slurry-like consistency. The slurry, which still contained water, was poured into a pan and dried at 60° C. in a vacuum drying cabinet. 333 g of a friable, black-brown substance were obtained which, in addition to the trace elements iron, copper, manganese and zinc, also contained potassium, nitrogen and phosphorus as well as about 15 percent by weight of water. The nutrient ions were present in the product in a form available to plants.

In the air space of vessels which were half-filled with the process products, a hydrogen cyanide concentration of O ppm was measured after heating to 50° C. for 50 hours.

What is claimed is:

1. A method of supplying plants with nutrients which comprises applying to the plants or a plant habitat a composition comprising as active ingredient an effective amount of a substance which is a modified azulmic acid, stabilized by condensation with a carbonyl compound, said azulmic acid prior to condensation containing from 0.5 to 55% by weight of ionic groups of the general formula

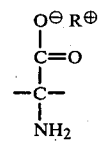

in which

R represents hydrogen, ammonium, one equivalent of a protonated or quaternized organic nitrogen base or of a sulphonium cation or one equivalent of a metal cation, and containing from 0.5 to 15% by weight of groups formed by decarboxylation reactions, said groups formed by decarboxylation reactions being of the formula

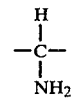

or an acid addition salt of such a stabilized azulmic acid or a complex compound of such a stabilized azulmic acid.

2. The method of claim 1, in which said substance is applied to an area of plant cultivation in an amount of about 0.1 to 200 kg/hectare.

3. The method of claim 1, in which said substance is in the form of a mixed product of said stabilized azulmic acid with an additive and/or in admixture with a solid or liquefied gaseous diluent or carrier or with a liquid diluent or carrier containing a surface-active agent.

4. The method of claim 1, further characterized in that R represents hydrogen, ammonium, one equivalent of lithium, sodium, potassium, beryllium, magnesium, calcium, strontium, barium, aluminum, thallium, tin, bismuth, copper, silver, gold, zinc, titanium, zirconium, chromium, manganese, iron, cobalt, nickel, platinum or palladium; or one equivalent of a protonated alkylamine with 1 to 6 carbon atoms, a protonated dialkylamine with 1 to 6 carbon atoms per alkyl group, a protonated trialkylamine with 1 to 6 carbon atoms per alkyl group, a protonated hydroxyalkylamine with 1 to 6 carbon atoms, a protonated di-(hydroxyalkyl)-amine with 1 to 6 carbon atoms per hydroxyalkyl group, a protonated tri-(hydroxyalkyl)-amine with 1 to 6 carbon atoms per hydroxyalkyl group, a protonated cycloalkylamine with 3 to 8 carbon atoms, a protonated alkylenediamine with 2 to 6 carbon atoms, a protonated guanidine, a protonated melamine or dicyandiamide; or one equivalent of a protonated, saturated or unsaturated heterocyclic nitrogen base with 5 to 7 ring members and 1 to 3 nitrogen atoms in the heterocyclic ring, or represents a cation formed by quaternization of any such basic nitrogen compound, or represents a trialkylsulphonium cation.

5. The method of claim 1, further characterized in that R represents hydrogen, ammonium, lithium, sodium or potassium.

6. The method of claim 1, further characterized in that R represents one equivalent of calcium.

7. The method of claim 1, further characterized in that R represents one equivalent of iron.

8. The method of claim 1, further characterized in that R represents one equivalent of a protonated cycloalkylamine with 3 to 8 carbon atoms, one equivalent of a protonated alkylenediamine with 2 to 6 carbon atoms, one equivalent of a protonated guanidine or one equivalent of a protonated melamine.

9. The method of claim 1, in which said acid addition salt of said stabilized azulmic acid is an acid addition salt of an acid selected from the group consisting of hydrogen halide acids, phosphoric acid, phosphorous acid, phospholine oxide-phosphonic acids, dialkylphosphoric acids, polyphosphoric acids, nitric acid, acids derived from sulphur and organic acids.

10. The method of claim 9, in which said hydrogen halide acid is hydrofluoric acid, hydrochloric acid or hydrobromic acid.

11. The method of claim 9, in which said dialkylphosphoric acid is dibutylphosphoric acid.

12. The method of claim 9, in which said polyphosphoric acid is a polyphosphoric acid with a molecular weight from 6,000 to 40,000.

13. The method of claim 9, in which said phospholine oxide-phosphonic acid has either of the formulas

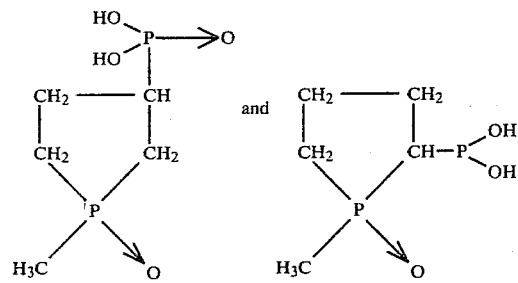

14. The method of claim 9, in which said acid derived from sulphur is sulphuric acid, ethylsulphonic acid, p-toluenesulphonic acid or naphthalene-1,5-disulphonic acid.

15. The method of claim 9, in which said organic acid is a saturated or unsaturated carboxylic acid, a halogenocarboxylic acid, a dicarboxylic acid or a half-ester derived therefrom, or an hydroxycarboxylic acid.

16. The method of claim 15, in which said saturated or unsaturated carboxylic acid is acetic acid, proprionic acid, 2-ethylcaproic acid, acrylic acid methacrylic acid, oleic acid or ricinoleic acid.

17. The method of claim 15, in which said halogenocarboxylic acid is chloroacetic acid, dichloroacetic acid or trichloroacetic acid.

18. The method of claim 15, in which said dicarboxylic acid is maleic acid, fumaric acid or succinic acid.

19. The method of claim 15, in which said hydroxycarboxylic acid is hydroxyacetic acid, tartaric acid, citric acid or salicylic acid.

20. The method of claim 1, in which said substance is a complex compound of said stabilized azulmic acid and a metal compound or ammonium salt.

21. The method of claim 20, in which said metal compound is selected from the group consisting of calcium chloride, acetate, nitrate, hydroxide and oxide; strontium nitrate; barium chloride and acetate; borates; aluminum acetate and formate; thallium sulfate; thallium nitrate; silicon tetrachloride; sodium and potassium silicate; tin(II) chloride; bismuth(III) hydroxide; bismuth(III) nitrate; copper sulfate, nitrate and acetate; silver nitrate; aurichlorohydric acid; zinc chloride and acetate; titanium tetrachloride and tetrabutylate; zirconium sulphate; vanadates; chromium(III) chloride; molybdates, tungstates and hetero-polyacids thereof; manganese(II) sulfate and acetate, iron(II)sulfate and acetate; iron(III) chloride; cobalt chloride; nickel chloride; hexachloroplatinic acid; and palladium(II) chloride.

22. The method of claim 20, in which said ammonium salt is ammonium nitrate or ammonium acetate.

23. The method of claim 1, in which said substance is an azulmic acid stabilized with a carbonyl compound selected from the group consisting of aldehydes, ketones and keto esters with reactive carbonyl groups.

24. The method of claim 23, in which said aldehyde is selected from the group consisting of formaldehyde, acetaldehyde, isobutyraldehyde, chloral, hydroxyethylaldehyde, hydroxypivalaldehyde, acrolein, crotonaldehyde, glyoxal, methyl-glyoxal, furfurol, hydroxymethylfurfurol, glucose, salicylaldehyde, hydroxyacetaldehyde, glyceraldehyde, and other aldehydes which are formed from formaldehyde under the conditions of the synthesis of formose.

25. The method of claim 23, in which said ketone is selected from the group consisting of dihydroxyacetone and cyclohexanone.

26. The method of claim 23, in which said keto ester is ethyl acetonate.

27. The method of claim 1, in which the effective amount of substance in said composition is from 0.1 to 95% by weight of said composition.

28. A method of improving soil comprising applying to the soil a composition comprising as active ingredient an effective amount of a substance which is a modified azulmic acid stabilized by condensation with a carbonyl compound, said azulmic acid prior to condensation containing from 0.5 to 55% by weight of ionic groups of the general formula

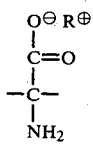

in which
R represents hydrogen, ammonium, one equivalent of a protonated or quaternized organic nitrogen base or of a sulphonium cation or one equivalent of a metal cation, and containing from 0.5 to 15% by weight of groups formed by decarboxylation reactions, said groups formed by decarboxylation reactions being of the formula

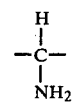

or an acid addition salt of such a stabilized azulmic acid or a complex compound of such a stabilized azulmic acid.

29. The method of claim 28, in which said substance is applied to the soil in an amount of about 0.1 to 200 kg/hectare.

* * * * *